US006829891B2

(12) United States Patent
Kato et al.

(10) Patent No.: US 6,829,891 B2
(45) Date of Patent: Dec. 14, 2004

(54) EXHAUST EMISSION CONTROL DEVICE AND METHOD OF CONTROLLING EXHAUST EMISSION

(75) Inventors: Zenichiro Kato, Mishima (JP); Hiromichi Yanagihara, Gotemba (JP); Toshihisa Sugiyama, Gotemba (JP); Yoshimitsu Henda, Numazu (JP); Kazuhiko Shiratani, Susono (JP); Rentaro Kuroki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/168,326
(22) PCT Filed: Sep. 18, 2001
(86) PCT No.: PCT/JP01/08115
  § 371 (c)(1),
  (2), (4) Date: Jun. 20, 2002
(87) PCT Pub. No.: WO02/40836
  PCT Pub. Date: May 23, 2002

(65) Prior Publication Data
  US 2002/0189247 A1 Dec. 19, 2002

(30) Foreign Application Priority Data
  Nov. 17, 2000 (JP) ........................... 2000-350587
  Jul. 19, 2001 (JP) ........................... 2001-219667

(51) Int. Cl.⁷ ................................ F01N 3/00
(52) U.S. Cl. ................ 60/297; 60/295; 60/304; 60/305; 60/311
(58) Field of Search .............. 60/280, 295, 297, 60/305, 304, 311; 55/DIG. 30, 315.1, 309.1

(56) References Cited

U.S. PATENT DOCUMENTS

| | | | | |
|---|---|---|---|---|
| 4,538,411 A | * | 9/1985 | Wade et al. | 60/274 |
| 4,866,932 A | | 9/1989 | Morita et al. | |
| 4,887,427 A | * | 12/1989 | Shinzawa et al. | 60/286 |
| 4,934,142 A | * | 6/1990 | Hayashi et al. | 60/297 |
| 5,396,764 A | * | 3/1995 | Rao et al. | 60/274 |
| 5,457,945 A | * | 10/1995 | Adiletta | 55/301 |
| 5,851,249 A | | 12/1998 | Henda et al. | |
| 5,908,480 A | | 6/1999 | Ban et al. | |
| 5,930,995 A | * | 8/1999 | Watanabe et al. | 60/311 |
| 5,941,066 A | | 8/1999 | Araki et al. | |

FOREIGN PATENT DOCUMENTS

DE  37 11 101 A1  10/1987

(List continued on next page.)

Primary Examiner—Binh Q. Tran
(74) Attorney, Agent, or Firm—Oliff & Berridge PLC

(57) ABSTRACT

A first heat-resistant filter medium is disposed in an exhaust pathway of an internal combustion engine. The first heat-resistant filter medium traps hydrocarbon compounds and carbon-containing particulates included in a flow of exhaust gas in a dispersive manner to bring the respective particulates and hydrocarbon compounds in contact with oxygen included in the exhaust gas. The trapped hydrocarbon compounds and the trapped carbon-containing particulates are subjected to combustion with the exhaust gas having a filter inflow temperature lower than a combustible temperature of the carbon-containing particulates. A second heat-resistant filter medium is further disposed downstream of the first heat-resistant filter medium to trap the remaining carbon-containing particulates, which have not been trapped by the first heat-resistant filter medium but have passed through the first heat-resistant filter medium. This arrangement desirably enhances the reduction rate of the particulates.

15 Claims, 15 Drawing Sheets

FOREIGN PATENT DOCUMENTS

| | | |
|---|---|---|
| EP | 0 559 907 A1 | 9/1993 |
| EP | 0 766 993 A2 | 4/1997 |
| EP | 0 798 452 A1 | 10/1997 |
| EP | 0 806 553 A2 | 11/1997 |
| EP | 0 823 545 A1 | 2/1998 |
| EP | 0 894 950 A2 | 2/1999 |
| JP | U 63-196419 | 12/1988 |
| JP | A 2-108806 | 4/1990 |
| JP | B2 7-106290 | 11/1995 |
| JP | A 10-47035 | 2/1998 |
| JP | A 10-131739 | 5/1998 |
| JP | A 2000-161044 | 6/2000 |

* cited by examiner

|  | MEAN FIBER DIAMETER | MEAN PORE DIAMETER | THICKNESS OF NON-WOVEN FABRIC |
|---|---|---|---|
| NON-WOVEN FABRIC A | 15 μm | 11 μm | 0.5mm |
| NON-WOVEN FABRIC B | 20 μm | 13 μm | 0.5mm |

EXHAUST EMISSION CONTROL DEVICE AND METHOD OF CONTROLLING EXHAUST EMISSION

TECHNICAL FIELD

The present invention relates to a technique of regulating and reducing particulates included in exhaust gases from an internal combustion engine.

BACKGROUND ART

The exhaust gas from internal combustion engines, especially Diesel engines, includes carbon-containing particulates like black smoke (soot), and there is a high demand of reducing the total emission of the carbon-containing particulates, in order to prevent further air pollution. There is a similar demand in direct injection gasoline engines where gasoline is directly injected into a combustion chamber, since the carbon-containing particulates may be discharged with the exhaust gas under some driving conditions.

One proposed method of remarkably reducing the carbon-containing particulates in the emission from an internal combustion engine has disposes a heat-resistant filter in an exhaust conduit of the internal combustion engine and uses the filter to trap the carbon-containing particulates included in the exhaust gas. This method significantly reduces the total quantity of the carbon-containing particulates released to the air, while requiring treatment of the trapped carbon-containing particulates to avoid potential troubles like the clogging of the filter and the lowered performance of the engine.

Several methods have been proposed to treat the trapped carbon-containing particulates. One proposed technique makes a noble metal catalyst, such as platinum, carried on the filter and utilizes the catalytic action of the noble metal for combustion (see JAPANESE PATENT PUBLICATION GAZETTE No. 7-106290). Another proposed technique intentionally raises the temperature of the exhaust gas for combustion of the trapped carbon-containing particulates on the filter (see PATENT APPLICATION No. 2000-161044). Combustion of the carbon-containing particulates by application of any of these techniques ensures treatment of the particulates prior to clogging of the filter. The filter having the higher trapping rate lowers the total quantity of the carbon-containing particulates released to the air.

The catalyst naturally deteriorates its performance in use. The catalyst used for a long time period can not completely treat the trapped carbon-containing particulates. This eventually leads to clogging of the filter. The technique of intentionally raising the temperature of the exhaust gas takes out the chemical energy of the fuel not in the form of the output of the engine but in the form of heat. This technique thus disadvantageously lowers the output of the engine or the fuel consumption efficiency.

By taking into account these problems, the inventors of the present invention have completed a technique of readily treating the trapped carbon-containing particulates and have filed for a patent application (PATENT APPLICATION No. 2000-300167). The technique disclosed in the application uses a heat-resistant filter to trap the carbon-containing particulates and the hydrocarbon compounds included in the flow of exhaust gas in a dispersive manner to bring the respective particulates and hydrocarbon compounds in contact with oxygen included in the exhaust gas. The dispersive trapping causes the hydrocarbon compounds to be gradually oxidized with oxygen in the exhaust gas, even when a filter inflow temperature of the exhaust gas is lower than a combustible temperature of the carbon-containing particulates. Highly active intermediate products and reaction heat produced through the oxidation are accumulated and eventually cause combustion of the carbon-containing particulates. Application of this technique enables the carbon-containing particulates to be effectively treated by simply making the carbon-containing particulates and the hydrocarbon compounds in the exhaust gas trapped on the filter in the dispersive manner. This is free from the problems like the clogging of the filter due to deterioration of the catalyst and the lowered performance of the engine.

It is, however, practically not easy for the filter to trap all the carbon-containing particulates and the hydrocarbon compounds included in the flow of exhaust gas in the dispersive manner to bring the respective particulates and hydrocarbon compounds in contact with oxygen included in the exhaust gas. It is thus highly probable that a trace amount of the carbon-containing particulates passes through the filter and is released to the air. The higher trapping rate of the filter to prevent the release makes it difficult to trap the carbon-containing particulates and the hydrocarbon compounds in a dispersive manner. This leads to failure of combustion of the trapped carbon-containing particulates with the exhaust gas of relatively low temperature.

The present invention has been completed to solve the drawbacks of the prior art techniques discussed above and to improve the technique of the pending patent application mentioned above. The object of the present invention is thus to stably control carbon-containing particulates included in the flow of exhaust gas from an internal combustion engine over a long time period without deteriorating the performances of the internal combustion engine and to reduce the total quantity of particulates released to the air.

DISCLOSURE OF THE INVENTION

At least part of the above and the other related objects is attained by a first emission control device that reduces carbon-containing particulates included in a flow of exhaust gas from an internal combustion engine. The first emission control device includes: a first heat-resistant filter medium that traps hydrocarbon compounds and the carbon-containing particulates included in the flow of exhaust gas in a dispersive manner to bring the respective particulates and hydrocarbon compounds in contact with oxygen included in the exhaust gas, and thereby makes the trapped hydrocarbon compounds and the trapped carbon-containing particulates subjected to combustion with the exhaust gas having a filter inflow temperature lower than a combustible temperature of the carbon-containing particulates; and a second heat-resistant filter medium that traps the remaining carbon-containing particulates, which have not been trapped by the first heat-resistant filter medium but have passed through the first heat-resistant filter medium.

There is an emission control method corresponding to the above emission control device.

The present invention is accordingly directed to a first emission control method that reduces carbon-containing particulates included in a flow of exhaust gas from an internal combustion engine. The first emission control method includes the steps of: using a first heat-resistant filter medium to trap hydrocarbon compounds and the carbon-containing particulates included in the flow of exhaust gas in a dispersive manner to bring the respective particulates and hydrocarbon compounds in contact with oxygen included in the exhaust gas; making the trapped hydrocarbon compounds and the trapped carbon-containing particulates subjected to combustion with the exhaust gas having an inflow temperature into the first heat-resistant filter medium lower than a combustible temperature of the carbon-containing particulates; and using a second heat-resistant filter medium to trap the remaining carbon-containing particulates, which have not been trapped by the first heat-resistant filter medium but have passed through the first heat-resistant filter medium.

In the first emission control device and the corresponding first emission control method, the first heat-resistant filter medium disposed upstream traps the carbon-containing particulates included in the flow of exhaust gas, and the second heat-resistant filter medium disposed downstream of the first heat-resistant filter medium traps the remaining carbon-containing particulates, which have not been trapped by the first heat-resistant filter medium but have passed through the first heat-resistant filter medium.

The arrangement of the present invention uses the second heat-resistant filter medium to trap and treat the remaining carbon-containing particulates passing through the first heat-resistant filter medium, thus significantly reducing the total quantity of the carbon-containing particulates released to the air.

In accordance with one preferable application of the emission control device, the second heat-resistant filter medium is capable of trapping the remaining carbon-containing particulates, which are smaller in size than the carbon-containing particulates collectable by the first heat-resistant filter medium.

This arrangement advantageously enables the carbon-containing particulates, which have not been trapped by the first heat-resistant filter medium but have passed through the first heat-resistant filter medium, to be effectively trapped by the second heat-resistant filter medium. In general, the filter material that is capable of trapping the finer carbon-containing particulates has the higher chance of clogging. In this arrangement, however, since most of the carbon-containing particulates in the exhaust gas are trapped by the first heat-resistant filter medium, application of the filter material that is capable of trapping the finer particulates to the second heat-resistant filter medium effectively reduces the total quantity of the particulates released to the air without the fear of clogging.

When the internal combustion engine is provided with a plurality of combustion chambers, an exhaust manifold that unites flows of exhaust gas from the plurality of combustion chambers to at least one joint flow; and an exhaust pipe that leads the joint flow of exhaust gas united by the exhaust manifold to the air, in one preferable structure of the emission control device, the first heat-resistant filter medium is disposed in the exhaust manifold, and the second heat-resistant filter medium is disposed in the exhaust pipe.

In this layout, the first heat-resistant filter medium is closed to the internal combustion engine, so that high-temperature exhaust gas is flown into the first heat-resistant filter medium. This facilitates combustion of the trapped carbon-containing particulates. The arrangement of disposing the second heat-resistant filter medium in the exhaust pipe after the exhaust manifold that unites the flows of exhaust gas desirably facilitates replacement of the second heat-resistant filter medium.

In the emission control device of the above layout, the first heat-resistant filter medium may be disposed at a specific position where the flows of exhaust gas from the plurality of combustion chambers are united to the at least one joint flow, in the exhaust manifold. In this arrangement, the first heat-resistant filter medium can be located in a relatively wide space. The wider space heightens the degree of freedom in shape of the filter medium and allows the filter medium to have more adequate shape and size. The specific position in the exhaust manifold, where the flows of exhaust gas from the respective combustion chambers are united to the at least one joint flow, are not apart from the combustion chambers. The exhaust gas of still high temperature is accordingly flown into the first heat-resistant filter medium disposed at the specific position. This factor, in combination of the adequate shape and size of the filter medium, ensures effective combustion of the trapped carbon-containing particulates.

In the emission control device, a filter material that does not trap most of metal sulfate particulates but allows passage of the metal sulfate particulates therethrough may be applied for the first heat-resistant filter medium. Here the metal sulfate particulates are produced from metal components added to lubricating oil of the internal combustion engine and sulfur in a fuel of the internal combustion engine and are suspended in the flow of exhaust gas.

The metal sulfates have extremely high thermal stability. If the first heat-resistant filter medium traps the metal sulfates in the exhaust gas, there is difficulty in treating the trapped particulates. This may cause clogging of the first heat-resistant filter medium. Application of the filter material that does not trap most of the metal sulfates but allows passage of the metal sulfates to the first heat-resistant filter medium desirably prevents the first heat-resistant filter medium from being clogged.

In accordance with one preferable embodiment, the emission control device further has a vane that is located on a pathway of the flow of exhaust gas from the internal combustion engine, is driven by the flow of exhaust gas, and breaks down the particulates included in the flow of exhaust gas. The first heat-resistant filter medium is disposed upstream of the vane, and the second heat-resistant filter medium is disposed downstream of the vane.

In this embodiment, the high-temperature exhaust gas is flown into the first heat-resistant filter medium to facilitate combustion of the trapped carbon-containing particulates. The particulates passing through the first heat-resistant filter medium are crushed by the vane and are thus more readily allowed to pass through the second heat-resistant filter medium. This arrangement desirably prevents the second heat-resistant filter medium from being clogged with the hardly combustible particulates like the metal sulfates.

When the internal combustion engine is provided with a supercharger that utilizes fluidization energy of the exhaust gas to supercharge intake air of the internal combustion engine, the vane of the emission control device may be a turbine of the supercharger actuated by the flow of exhaust gas.

The turbine of the supercharger rotates at a high speed and effectively crushes down the particulates included in the exhaust gas. This desirably prevents the second heat-resistant filter medium from being clogged.

In the emission control device applied to the internal combustion engine with the supercharger, a control catalyst may be disposed in back wash of the second heat-resistant filter medium to reduce air pollutants in the exhaust gas passing through the second heat-resistant filter medium. The control catalyst functions to treat gaseous air pollutants in the exhaust gas, such as carbon monoxide and SOF (Soluble Organic Fraction), prior to release of the exhaust gas to the air.

In the emission control device, a filter material with an active oxygen release agent carried thereon to take in and hold oxygen in the presence of excess oxygen in its atmosphere and release the oxygen held therein as active oxygen with a decrease in concentration of oxygen in the atmosphere may be applied for the second heat-resistant filter medium.

The active oxygen is highly reactive and thus quickly oxidizes the carbon-containing particulates trapped on the second heat-resistant filter medium to convert the carbon-containing particulates into harmless substances like carbon dioxide and water. The active oxygen release agent carried on the second heat-resistant filter medium releases active oxygen with a variation in concentration of oxygen in the exhaust gas, which is accompanied by a variation in driving conditions of the internal combustion engine, and thereby effectively treats the trapped carbon-containing particulates.

In the emission control device of the present invention, most of the carbon-containing particulates included in the exhaust gas are trapped by the first heat-resistant filter medium, so that there is practically no chance that a large quantity of the carbon-containing particulates are flown into the second heat-resistant filter medium. It is thus unlikely that the surface of the second heat-resistant filter medium is covered with the large amount of inflow carbon-containing particulates and can not take in excess oxygen or release active oxygen.

In the emission control device of the above embodiment, a filter material with a noble metal catalyst belonging to a platinum group carried thereon in addition to the active oxygen release agent may be applied for the second heat-resistant filter medium.

As is known in the art, the noble metal belonging to the platinum group has moderate oxidation activity when being used as the catalyst. The reaction of taking in excess oxygen in the exhaust gas and releasing the intake excess oxygen as active oxygen with a decrease of the oxygen concentration is a redox reaction as described later. Carriage of the noble metal, which belongs to the platinum group and has moderate oxidation activity, in addition to the active oxygen release agent accelerates the reaction of taking in excess oxygen and releasing active oxygen, thereby effectively treating the carbon-containing particulates trapped on the second heat-resistant filter medium.

In order to solve at least part of the problems of the prior art discussed above, the present invention is also directed to a second emission control device that reduces carbon-containing particulates, which are included in a flow of exhaust gas with a variation in flow rate emitted from an internal combustion engine, using a filter material having a large number of pores tangled in a three-dimensional manner. The second emission control device includes: a first heat-resistant filter medium that is composed of the filter material, makes the exhaust gas flown into the pores, which are greater in size than the carbon-containing particulates, and causes the carbon-containing particulates to collide with and adhere to regions defining the pores of the filter material, thereby trapping the carbon-containing particulates; a second heat-resistant filter medium that filters the flow of exhaust gas passing through the first heat-resistant filter medium to trap the remaining carbon-containing particulates included in the flow of exhaust gas; and a flow rate variation mitigation module that mitigates the variation in flow rate of the exhaust gas flown into the second heat-resistant filter medium.

There is an emission control method corresponding to the above emission control device. The present invention is accordingly directed to a second emission control method that reduces carbon-containing particulates, which are included in a flow of exhaust gas with a variation in flow rate emitted from an internal combustion engine, using a filter material having a large number of pores tangled in a three-dimensional manner. The second emission control method includes the steps of: making the exhaust gas flown into the pores, which are greater in size than the carbon-containing particulates, and causing the carbon-containing particulates to collide with and adhere to regions defining the pores of the filter material, thereby trapping the carbon-containing particulates; mitigating the variation in flow rate of the exhaust gas; and filtering the flow of exhaust gas with the mitigated variation in flow rate, thereby trapping the remaining carbon-containing particulates included in the flow of exhaust gas.

In the second emission control device and the corresponding second emission control method of the present invention, the exhaust gas including the carbon-containing particulates with a variation in flow rate is flown into the first heat-resistant filter medium. The first heat-resistant filter medium has pores, which are greater in size than the carbon-containing particulates. As the exhaust gas is flown into such pores, the carbon-containing particulates collide with and adhere to the regions defining the pores of the filter material. Namely this process dynamically traps the carbon-containing particulates. The exhaust gas passing through the first heat-resistant filter medium is then filtered by the second heat-resistant filter medium. This process statically traps the remaining carbon-containing particulates in the exhaust gas. In the static trapping process, the exhaust gas with the mitigated variation in flow rate is flown into the second heat-resistant filter medium. The terms 'dynamically trap' and 'statically trap' will be explained later.

This arrangement enables the carbon-containing particulates included in the exhaust gas to be efficiently treated and reduced without clogging the filter medium, because of the reasons discussed below.

The first heat-resistant filter medium causes the carbon-containing particulates to collide with and adhere to the regions defining the pores of the filter material and thus dynamically traps the carbon-containing particulates. This mechanism is described with reference to FIG. 17. FIG. 17(a) conceptually shows the flow of exhaust gas through the pores formed inside the first heat-resistant filter medium. The hatched portions schematically represent members defining the pores. The flow of exhaust gas passes through the pores defined by these members. The arrows schematically represent the flows of exhaust gas passing through the pores. The pores formed inside the heat-resistant filter medium are tangled in a three-dimensional manner. The exhaust gas passes through the pores, while often changing its flow direction as illustrated. In the course of changing the flow direction of the exhaust gas, small particulate readily changes its direction and goes on the flow of exhaust gas to pass through the pores. Large particulate, however, can not readily change its direction but collides with the inner face of the pores.

FIG. 17(b) is a conceptual view showing this aspect in detail. The arrow of the solid line represents the flow of exhaust gas, and the arrow of the broken line represents the flow of particulate in the exhaust gas. As the flow of exhaust gas changes its direction, a small particulate Ps goes on the flow of exhaust gas with the changing direction. A large particulate PL, on the other hand, does not change its direction with the change of the flow direction of the exhaust gas but collides with the inner face of a pore. The carbon-containing particulates in the exhaust gas include a wet fraction from non-combusted fuel and engine oil. The particulate colliding with the inner face of the pore adheres to the inner face of the pore and is thereby trapped therein by the function of the wet fraction.

Changing the flow direction of the particulate in the exhaust gas with the changed flow direction of the exhaust gas is attributed to the viscosity of the fluid (that is, the exhaust gas). Immediately after the change of the flow direction of the exhaust gas, the particulate moves in the former direction according to the law of inertia. The particulate then comes across the flow of exhaust gas and meets resistance of the flow of exhaust gas. More specifically, since the particulate and the exhaust gas surrounding the particulate have different flow directions, a significant velocity gradient occurs on the surface of the particulate. A force of the velocity gradient multiplied with a viscosity acts on the particulate. The particulate in the exhaust gas changes its flow direction by this viscosity-based force. Namely the phenomenon of changing the flow direction of the particulate with the changed flow direction of the exhaust gas is attributed to the viscosity-based force of the fluid acting on the particulate. By taking into account such attribution, the degree of easiness of changing the flow direction of the particulate with the changed flow direction of the exhaust gas is expressible with a Reynolds number Re. The Reynolds number Re is a dimensionless number expressed by the equation of:

$$Re = Ud/v$$

where U, d, and v respectively denote the flow rate, the size of the particulate, and the dynamic viscosity of the exhaust gas. The Reynolds number physically represents the effect of the viscosity of the fluid on the state of the flow. The smaller Reynolds number Re results in the greater effect of the viscosity on the flow. The larger Reynolds number Re, on the contrary, results in the greater effect of inertia on the flow.

As clearly understood from the above equation, the smaller particle diameter of the carbon-containing particulates included in the exhaust gas leads to the smaller Reynolds number Re and the greater effect of the viscosity. The particulate then readily changes its flow direction and goes on the flow of exhaust gas to pass through the pores. The greater particle diameter of the carbon-containing particulates, on the other hand, leads to the larger Reynolds number Re. This relatively reduces the effect of the viscosity but enhances the effect of inertia. As the exhaust gas changes its flow direction, the particulate does not readily changes its flow direction but collides with the inner face of the pore to be trapped therein. In the specification hereof, the term 'dynamically trap' represents trapping the particulate through collision and adhesion according to the mechanism discussed above. The first heat-resistant filter medium dynamically trap the carbon-containing particulates included in the exhaust gas. This process mainly traps large particulates.

The subsequent second heat-resistant filter medium filters the exhaust gas, which has passed through the first heat-resistant filter medium, so as to statically trap the remaining smaller carbon-containing particulates included in the exhaust gas. The second heat-resistant filter medium having a large number of small pores or narrow gaps is used to filter the exhaust gas including the carbon-containing particulates and thereby trap the particulates that can not pass through the pores or gaps. In the specification hereof, the term 'statically trap' represents the state of gently filtering off and trapping the particulates in the exhaust gas without causing collision or adhesion. The 'dynamically trapping' process and the 'statically trapping' process adopt significantly different mechanisms for trapping. The process of 'dynamically trapping' traps the particulates by making the exhaust gas flown into the pores that are greater in size than the particulates. The process of 'statically trapping', on the other hand, traps the particulates by making the exhaust gas flown into the pores or gaps that are practically equivalent or smaller in size to or than the particulates.

In the case where the filter material having small pores or narrow gaps is applied to 'statically trap' the particles in the exhaust gas, the small pores or the narrow gaps are soon clogged with large particulates. The arrangement of 'dynamically trapping' the large particulates in the exhaust gas before 'statically trapping' the remaining particulates in the exhaust gas desirably prevents the filter material, which statically filters the exhaust gas, from being clogged.

In the second emission control device and the second emission control method of the present invention, while the exhaust gas with the variation in flow rate is flown into the heat-resistant filter medium, the exhaust gas with the mitigated variation in flow rate is flown into the second heat-resistant filter medium. This arrangement further prevents clogging of the filter medium and thus more efficiently traps the particulates. When the exhaust gas flown into the first heat-resistant filter medium has the variation in flow rate, the carbon-containing particulates included in the exhaust gas are flown into the pores at a higher speed corresponding to the variation in flow rate. This results in collision and adhesion of even smaller particulates. The increase in rate of the flow into the pores raises the Reynolds number Re described above to have the greater effects of inertia on even the small particulates. The particulates are thus apt to collide with the inner face of the pores without changing the direction of the flow.

The first heat-resistant filter medium effectively traps the large carbon-containing particulates according to the mechanism discussed above. The small carbon-containing particulates, however, go on the flow of exhaust gas and pass through the first heat-resistant filter medium. The flow of exhaust gas passing through the first heat-resistant filter medium is then led into the second heat-resistant filter medium. Since the flow of exhaust gas has the mitigated variation in flow rate, the small particulates do not move around the surface of the second heat-resistant filter medium due to the varying flow rate of the exhaust gas. The small carbon-containing particulates in the exhaust gas can thus be quickly trapped by the second heat-resistant filter medium.

The carbon-containing particulates in the exhaust gas include the wet fraction from the non-combusted fuel and engine oil as mentioned above. The small particulate moving around the surface of the second heat-resistant filter medium is combined with surrounding particulates and grown to a greater size. The grown particulates are likely to clog the second heat-resistant filter medium. When the flow of exhaust gas with the mitigated variation in flow rate is led into the second heat-resistant filter medium, the second heat-resistant filter medium is not clogged with the grown carbon-containing particulates but efficiently traps the particulates.

As described above, the second emission control device and the corresponding second emission control method of the present invention cause the exhaust gas with the variation in flow rate to be flown into the first heat-resistant filter medium. The first heat-resistant filter medium can thus dynamically trap even relatively small carbon-containing particulates. This causes only smaller carbon-containing particulates to be flown into the second heat-resistant filter medium and thus effectively prevents the second heat-resistant filter medium from being clogged. The exhaust gas flown into the second heat-resistant filter medium has the mitigated variation in flow rate. The mitigated variation in flow rate enables the second heat-resistant filter medium to quickly trap the small carbon-containing particulates and prevents aggregation of particulates, which may cause clogging of the filter medium.

The exhaust gas includes metal sulfate particulates, which are produced from metal components added to lubricating oil of the internal combustion engine and sulfur in the fuel of the internal combustion engine, in addition to the carbon-containing particulates as mentioned previously. The metal sulfate particulates are not large enough to be dynamically trapped by the first heat-resistant filter medium. The first heat-resistant filter medium is thus not clogged with the thermally stable metal sulfate particulates. The particulates passing through the first heat-resistant filter medium may be trapped by the second heat-resistant filter medium. The second heat-resistant filter medium is disposed at a location allowing easy access for maintenance, compared with the first heat-resistant filter medium. Even if the second heat-resistant filter medium is clogged, the second heat-resistant filter medium is thus readily accessible for maintenance.

In accordance with one preferable application of the second emission control device of the present invention, the first heat-resistant filter medium is composed of a filter material that traps the hydrocarbon compounds and the carbon-containing particulates included in the flow of exhaust gas in a dispersive manner to bring the respective particulates and hydrocarbon compounds in contact with oxygen included in the exhaust gas and thereby makes the trapped hydrocarbon compounds and the trapped carbon-containing particulates subjected to combustion with the exhaust gas having a filter inflow temperature lower than a combustible temperature of the carbon-containing particulates. The second heat-resistant filter medium is composed of a filter material with an active oxygen release agent carried thereon to take in and hold oxygen in the presence of excess oxygen in its atmosphere and release the oxygen held therein as active oxygen with a decrease in concentration of oxygen in the atmosphere.

The first heat-resistant filter medium that is capable of trapping relatively large carbon-containing particulates traps the hydrocarbon compounds and the carbon-containing particulates included in the flow of exhaust gas in a dispersive manner to bring the respective particulates and hydrocarbon compounds in contact with oxygen included in the exhaust gas. This ensures combustion of the trapped carbon-containing particulates. Since the relatively large carbon-containing particulates have been trapped by the first heat-resistant filter medium, the second heat-resistant filter medium mainly traps relatively small carbon-containing particulates. The relatively small carbon-containing particulates trapped on the second heat-resistant filter medium are quickly treated by active oxygen. Such quick treatment effectively prevents the second heat-resistant filter medium from being clogged. Such quickly treatment of the trapped particulates facilitates further trapping of the particulates and thus enhances the trapping efficiency of the carbon-containing particulate s.

In one preferable embodiment of the emission control device of the above arrangement, a supercharger that is actuated by fluidization energy of the exhaust gas and supercharges intake air of the internal combustion engine is located between the first heat-resistant filter medium and the second heat-resistant filter medium as the means of mitigating the variation in flow rate of the exhaust gas flown into the second heat-resistant filter medium. The supercharger works as a hydrodynamic flow-restriction element. Passage through the supercharger mitigates the variation in flow rate of the exhaust gas. This allows the second heat-resistant filter medium to efficiently trap the small carbon-containing particulates in the exhaust gas and effectively prevents the second heat-resistant filter medium from being clogged, because of the reason explained previously.

The means of mitigating the variation in flow rate is not restricted to the supercharger, but may narrow the pathway of the exhaust gas between the first heat-resistant filter medium and the second heat-resistant filter medium, may have an orifice, or may have a hydrodynamic volume element. The volume element represents a tank-shaped portion inserted in the middle of the pathway of the exhaust gas. Any of such means provided in the middle of the pathway of the exhaust gas ensures mitigation of the variation in flow rate of the exhaust gas. The supercharger is, however, preferable since it has an additional function to enhance the output of the internal combustion engine.

In one preferable embodiment of the emission control device with the supercharger located between the first heat-resistant filter medium and the second heat-resistant filter medium, a flow-restriction element is disposed in back wash of the second heat-resistant filter medium. The flow-restriction element has an orifice or otherwise narrows the pathway of the exhaust gas to intentionally heighten the flow resistance and thereby restrict the flow of the exhaust gas. The flow-restriction element disposed in back wash of the second heat-resistant filter medium, in addition to the supercharger advantageously attains further mitigation of the variation in flow rate of the exhaust gas flown into the second heat-resistant filter medium.

The flow-restriction element disposed in back wash of the second heat-resistant filter medium may be a control catalyst that reduces air pollutants included in the flow of exhaust gas. Gaseous air pollutants like carbon monoxide and SOF (soluble organic fraction), in addition to the carbon-containing particulates are included in the flow of exhaust gas. The control catalyst disposed in back wash of the second heat-resistant filter medium as the flow-restriction element desirably reduces such air pollutants. Even if the air pollutants like carbon monoxide are produced by some reason in the course of combustion of the carbon-containing particulates trapped by the first heat-resistant filter medium, the control catalyst advantageously prevents the air pollutants from being released to the air.

BEST MODES OF CARRYING OUT THE INVENTION

With a view to further clarifying the functions and the effects of the present invention, some modes of carrying out the present invention are discussed below in the following sequence:

A. First Embodiment
  A-1. System Construction
    A-1-1. Construction of Engine
    A-1-2. Structure of Particulate Filter
  A-2. Function of Regulating and Reducing Carbon-Containing Particulates in First Embodiment
    A-2-1. Control Function of Upstream Particulate Filter 100
    A-2-2. Complementary Function of Downstream Particulate Filter 200
  A-3. Modifications
B. Second Embodiment
  B-1. System Construction
    B-1-1. Structure of Downstream Particulate Filter 300
    B-1-2. Active Oxygen Release Function of Particulate Filter 300
  B-2. Function of Regulating and Reducing Carbon-Containing Particulates in Second Embodiment
C. Third Embodiment
  C-1. Modifications
A. First Embodiment
A-1. System Construction The following describes application of an emission control device of the present invention to a Diesel engine as one embodiment. The emission control device of the present invention is applicable not only to Diesel engines but to gasoline engines where a fuel is directly injected into a cylinder for combustion and other internal combustion engines. The principle of the present invention is also applicable to any internal combustion engines for vehicles and ships as well as stationary internal combustion engines.

A-1-1. Construction of Engine

Figure 1:
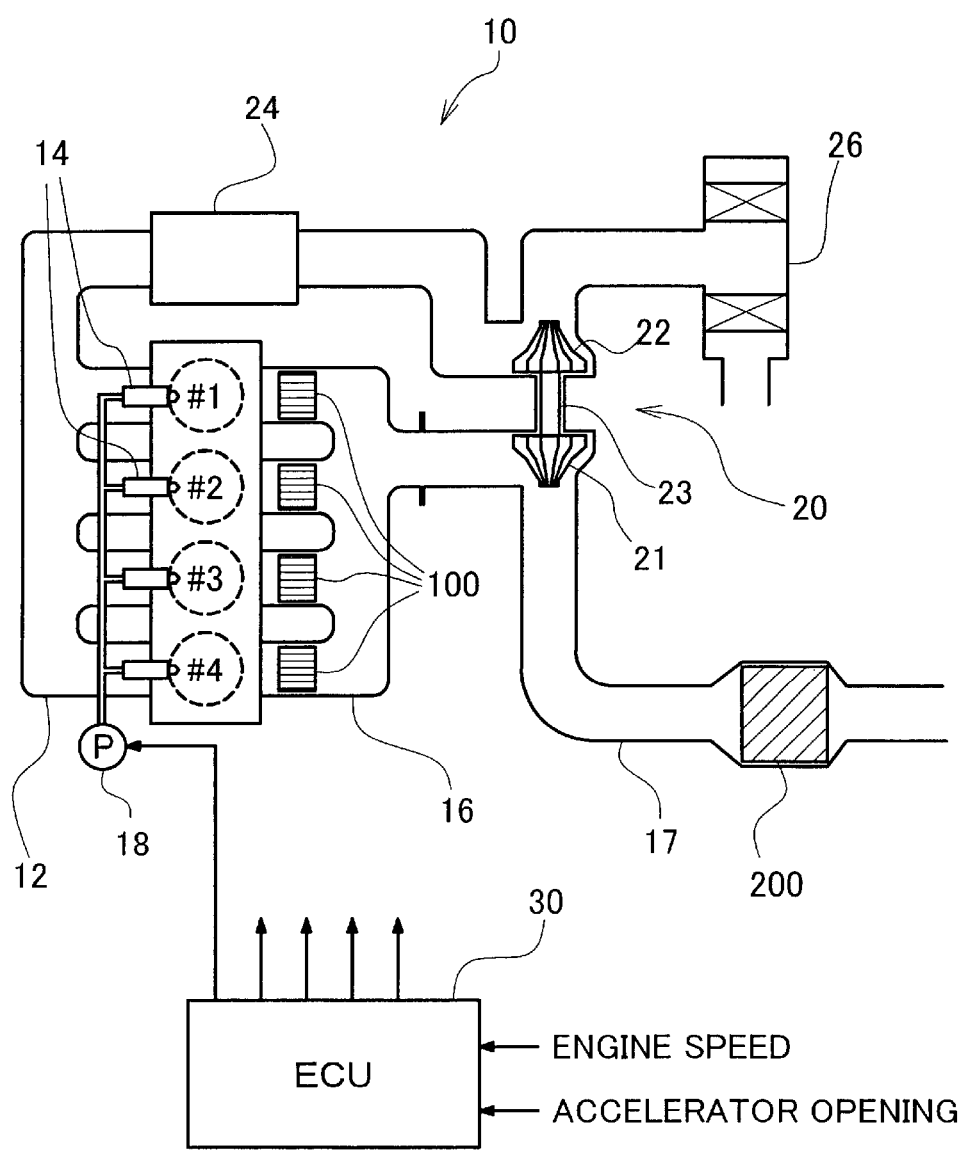
FIG. 1 illustrates the construction of a Diesel engine with an emission control device of a first embodiment applied thereto.

FIG. 1 schematically illustrates the construction of a Diesel engine 10 with an emission control device of a first embodiment applied thereto. The Diesel engine 10 is a 4-cylinder engine and has four combustion chambers #1 through #4. The air is supplied to each of the combustion chambers via an intake pipe 12, while a fuel is injected from a fuel injection valve 14 set in each combustion chamber. This leads to combustion of the air and the fuel in the combustion chamber, and exhaust gas produced due to the combustion is discharged through an exhaust manifold 16 and an exhaust pipe 17 to the air.

A supercharger 20 is provided in the middle of the exhaust pipe 17. The supercharger 20 has a turbine 21 located in the exhaust pipe 17, a compressor 22 set in the intake pipe 12, and a shaft 23 connecting the turbine 21 with the compressor 22. The flow of exhaust gas discharged from the combustion chamber rotates the turbine 21 of the supercharger 20, so as to drive, via the shaft 23, a compressor 22, which compresses the air and supplies the compressed air to each combustion chamber. An air cleaner 26 is arranged upstream of the compressor 22. The compressor 22 compresses the intake air through the air cleaner 26 and feeds the compressed air into each combustion chamber. Since the air compressed by the compressor 22 has the raised temperature, an inter cooler 24 for cooling down the air is disposed downstream of the compressor 22. The compressed air may thus be cooled down by the inter cooler 24 and subsequently fed into the combustion chamber.

A particulate filter 100 is disposed in each of the combustion chambers #1 through #4 in the exhaust manifold 16, and a particulate filter 200 is disposed in the exhaust pipe 17. Namely the particulate filters 100 are arranged upstream of the turbine 21, whereas the particulate filter 200 is arranged downstream of the turbine 21. Each of the particulate filters 100 disposed upstream of the turbine 21 traps particulates and hydrocarbon compounds included in the flow of exhaust gas, while utilizing the reaction heat of the hydrocarbon compounds to make the trapped particulates subjected to combustion in the exhaust gas of relatively low temperature. The particulate filter 200 disposed downstream of the turbine 21 traps the remaining carbon-containing particulates passing through the upstream particulate filters 100. The particulate filters 100 and 200 will be discussed later in detail.

The particulate filter 100 may be disposed in the exhaust pipe 17 upstream of the turbine 21, instead of in the exhaust manifold 16. In the structure where the particulate filters 100 are disposed in the exhaust manifold 16, the dynamic pressure of the exhaust gas ejected from the combustion chambers is effectively convertible into heat by the function of the particulate filters 100. This desirably accelerates combustion of the carbon-containing particulates trapped on the filters. In the structure where the particulate filter 100 is disposed in the exhaust pipe 17 upstream of the turbine 21, on the other hand, the less spatial restriction desirably allows application of a large-capacity filter.

A fuel supply pump 18 and the fuel injection valve 14 under control of an engine control ECU 30 function to inject an appropriate quantity of fuel into each combustion chamber at an adequate timing. The engine control ECU 30 detects driving conditions of the engine including engine speed Ne and an accelerator opening θac, and adequately regulates the fuel supply pump 18 and the fuel injection valve 14 according to the detected driving conditions.

A-1-2. Structure of Particulate Filter

The description first regards the particulate filter 100 disposed in each of combustion chambers upstream of the turbine 21, and then the particulate filter 200 disposed downstream of the turbine 21.

(1) Structure of Upstream Particulate Filter 100

Figure 2:
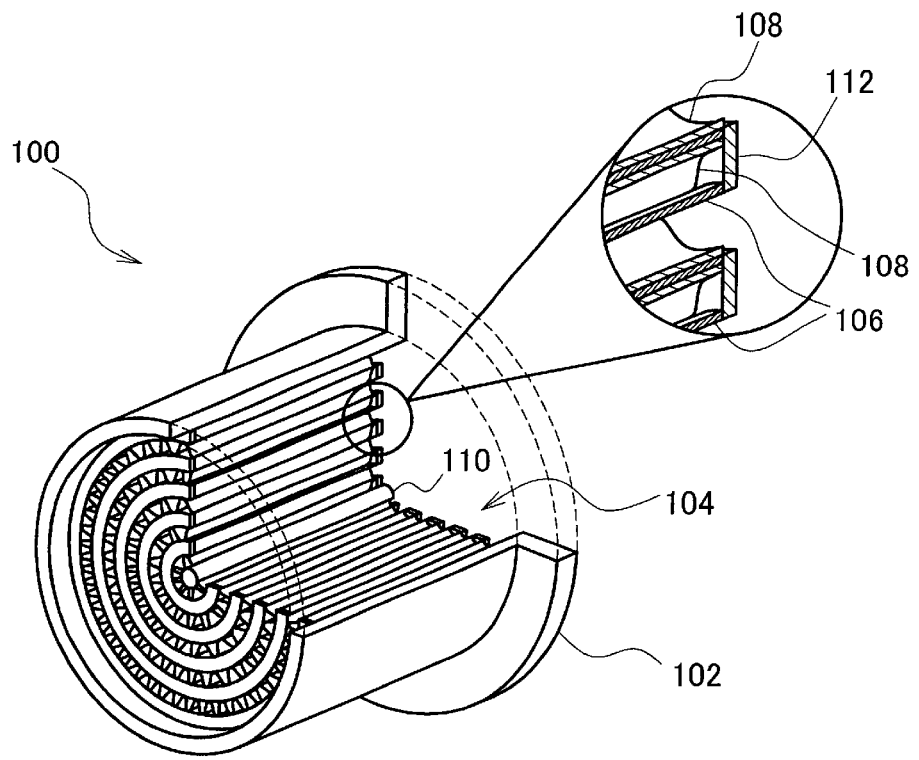
FIG. 2 shows the appearance and the structure of a particulate filter in the embodiment.

FIG. 2 is a perspective view illustrating the appearance of the particulate filter 100 disposed upstream of the turbine 21. With a view to better understanding, part of the cross section is enlarged to show the internal structure. The particulate filter 100 includes a cylindrical case 102 and an element 104 that is inserted in the case 102 and has the outer circumference welded to the case 102. The element 104 has a rolled cylindrical structure, in which a non-woven fabric 106 of a heat-resistant metal and a corrugated sheet 108 of a heat-resistant metal in piles are rolled up on a core 110. The element 104 used in the particulate filter 100 of the embodiment has the outer diameter of approximately 55 mm and the length of approximately 40 mm. These dimensions can appropriately be varied according to the displacement of the Diesel engine and the inner diameter of the exhaust manifold 16 or the exhaust pipe 17.

The non-woven fabric 106 is rolled up with the corrugated sheet 108, such that adjoining layers of the non-woven fabric 106 are kept at fixed intervals by means of the corrugated sheet 108. A large number of pathways along the axis of the core 110 are accordingly formed between the non-woven fabric 106 and the corrugated sheet 108. Sealing plates 112 are welded to both ends of the element 104. The sealing plates 112 alternately close the pathways formed between the non-woven fabric 106 and the corrugated sheet 108, so as to define the construction that allows the flow of the exhaust gas to pass through the non-woven fabric 106. The function of the sealing plates 112 to define the construction that allows passage of the exhaust gas through the non-woven fabric 106 is discussed below with reference to FIG. 3.

Figure 3:
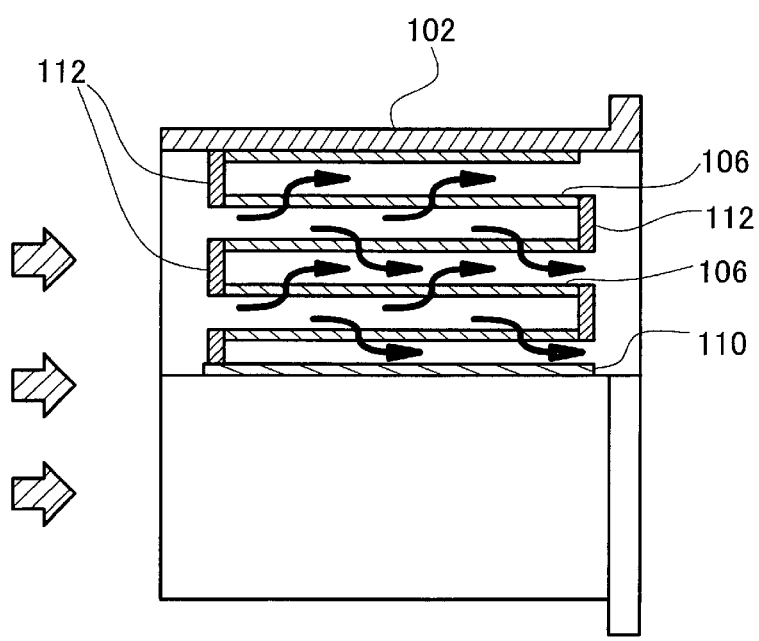
FIG. 3 conceptually shows a process of trapping particulates included in a flow of exhaust gas by means of the particulate filter of the embodiment.

FIG. 3 conceptually illustrates the sectional structure of the particulate filter 100. For simplicity of illustration, the corrugated sheet 108 is omitted from the illustration of FIG. 3. As clearly shown, the sealing plates 112 alternatively close the pathways formed between the adjoining layers of the non-woven fabric 106 kept at fixed intervals. The flow of the exhaust gas from the left side of the drawing as shown by the hatched arrows in FIG. 3 enters the pathways that are not closed by the sealing plates 112. The outlets of these pathways are, however, closed by the sealing plates 112. The flow of the exhaust gas accordingly penetrates the non-woven fabric 106 defining the side faces of the pathways and goes to the pathways having the non-closed outlets as shown by the thick arrows. As the flow of the exhaust gas passes through the non-woven fabric 106, carbon-containing particulates like soot included in the exhaust gas are trapped by the non-woven fabric 106.

Figures 4, 5:
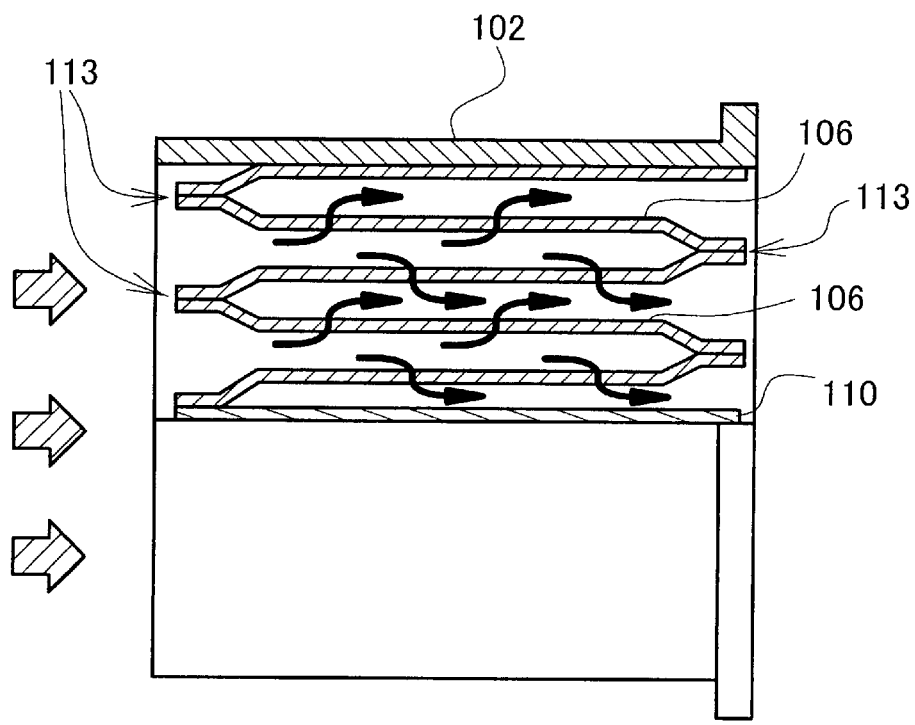
FIG. 4 shows dimensions of non-woven fabrics applicable to the particulate filter of the embodiment.
FIG. 5 conceptually shows a process of trapping particulates included in the flow of exhaust gas by means of another particulate filter in one modified example of the embodiment.

A non-woven fabric that is made of a heat-resistant iron alloy and has dimensions of predetermined ranges as shown in FIG. 4 is applied for the non-woven fabric 106. The non-woven fabric 106 can thus dispersedly trap the carbon-containing particulates and the hydrocarbon compounds in such a manner that brings the respective particulates and hydrocarbon compounds in contact with oxygen in the exhaust gas. Trapping the particulates in the three-dimensionally dispersed manner causes spontaneous combustion when the total amount of the trapped particulates reaches a certain level. The mechanism of dispersedly trapping the carbon-containing particulates and the hydrocarbon compounds, as well as the mechanism of spontaneous combustion of the dispersedly trapped carbon-containing particulates will be discussed later.

The 'mean fiber diameter' in the table of FIG. 4 represents a mean diameter of metal fibers constituting the non-woven fabric. The metal non-woven fabric is made of countless metal fibers tangled in a complicated manner. Intricately divaricating three-dimensional pathways are formed between the metal fibers. The 'mean pore diameter' is an index representing the cross section of the pathways formed between the metal fibers. In the specification hereof, the mean pore diameter represents the mean value of the pore diameter measured according to the Washburn's equation, and is the pore diameter having the accumulated pore volume of 50%. The numerical value of the mean pore diameter is varied in measurement of another known method. The simplest way observes the surface or the cross section of the metal non-woven fabric with a microscope for measurement.

The dimensions of the non-woven fabric shown in FIG. 4 are only illustrative and are not restrictive in any sense. Although the metal non-woven fabric of the heat-resistant iron alloy is used in this embodiment, the metal non-woven fabric may be made of any other known heat-resistant metal.

In the structure of this embodiment, the sealing plates 112 are welded to both ends of the element 104. One possible modification is a structure without the sealing plates 112.

FIG. 5 is a sectional view illustrating the modified structure of the particulate filter 100 in which the element does not have the sealing plates. For clarity of illustration, the corrugated sheet 108 is omitted from the illustration of FIG. 5. In the structure of the embodiment shown in FIG. 3, the sealing plates 112 are alternately welded to both ends of the non-woven fabric 106. Instead of welding the sealing plates, the adjoining layers of the non-woven fabric are welded to each other at ends 113 in the modified structure shown in FIG. 5. Such modified arrangement does not require the sealing plates 112 and thus simplifies the structure of the particulate filter 100.

(2) Structure of Downstream Particulate Filter 200

Figure 6A:
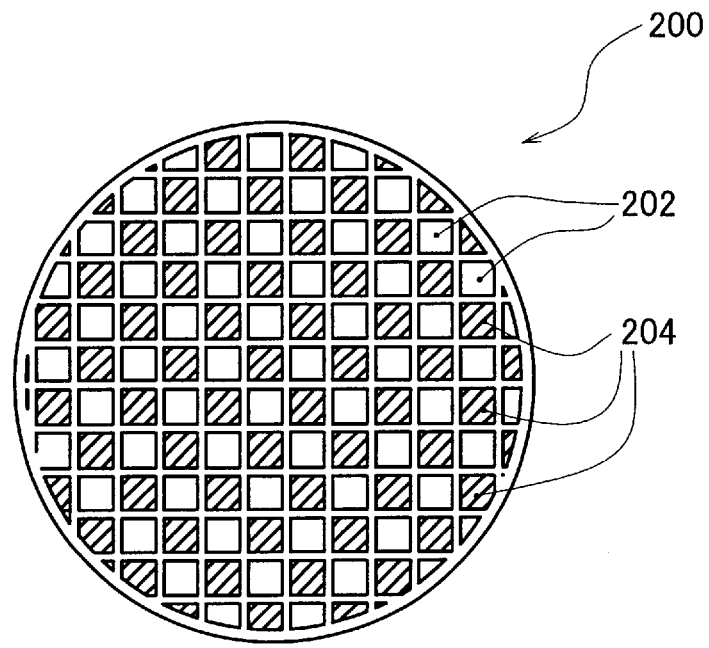
FIG. 6 shows the structure of a downstream particulate filter disposed in the emission control device of the first embodiment.

FIG. 6 shows the structure of the particulate filter 200 disposed downstream of the turbine 21. FIG. 6(*a*) is a front view of the particulate filter 200 seen from the inflow side of the exhaust gas, and FIG. 6(*b*) is a side sectional view. As illustrated, the particulate filter 200 arranged downstream of the turbine 21 is a cordierite ceramic filter of honeycomb structure. A large number of pathways 202 are formed in the particulate filter 200 of honeycomb structure to allow passage of the exhaust gas. Fillers 204 are alternately attached to upstream ends or downstream ends of these pathways. The fillers 204 are expressed by hatching in FIG. 6.

The flow of exhaust gas from the left side of FIG. 6(*b*) enters the particulate filter 200 through the pathways 202 without the fillers 204 on their upstream ends. The downstream ends of these pathways are, however, closed by the fillers 204. As shown by the thick arrows in FIG. 6(*b*), the flow of the exhaust gas passes through bulkheads 206 of the pathways 202 to the pathways 202 without the fillers 204 on their downstream ends. Cordierite has the porous structure formed in the process of calcination. As the flow of exhaust gas passes through the porous structure of the bulkheads 206, the porous structure traps the carbon-containing particulates in the exhaust gas.

The particulate filter 200 downstream of the turbine 21 is not restricted to the ceramic filter. Any known heat-resistant filter may be applicable as long as it has a pore diameter distribution equivalent to or smaller than the pore diameter of the particulate filter 100 upstream of the turbine 21.

A-2. Function of Regulating and Reducing Carbon-Containing Particulates in First Embodiment The following describes the function of regulating and reducing the carbon-containing particulates in the emission control device of the first embodiment where the particulate filters 100 are disposed upstream of the turbine 21 and the particulate filter 200 is disposed downstream of the turbine 21. In the emission control device of the first embodiment, the upstream particulate filters 100 and the downstream particulate filter 200 function in a complementary manner, so that the carbon-containing particulates included in the exhaust gas are efficiently controlled. The following description first regards the 'spontaneous regenerating function' of the upstream particulate filters 100 and then the function of the complementary downstream particulate filter 200.

A-2-1. Control Function of Upstream Particulate Filter 100

The non-woven fabric 106 of the particulate filter 100 is the heat-resistant non-woven fabric having the dimensions of the predetermined ranges shown in FIG. 4. The carbon-containing particulates and the hydrocarbon compounds included in the exhaust gas are dispersedly trapped inside the non-woven fabric 106 to come into contact with oxygen in the exhaust gas. Trapping the particulates in the dispersed manner causes spontaneous combustion when the total amount of the trapped particulates reaches a certain level, even if the temperature of the exhaust gas is lower than the combustible temperature of the carbon-containing particulates. This ensures effective combustion of the carbon-containing particulates trapped on the filter. This function of the particulate filter 100 is referred to as the 'spontaneous regenerating function' in this specification. The mechanism of the 'spontaneous regenerating function' has not been fully elucidated, but the estimated mechanism is briefly explained below.

Figure 7:
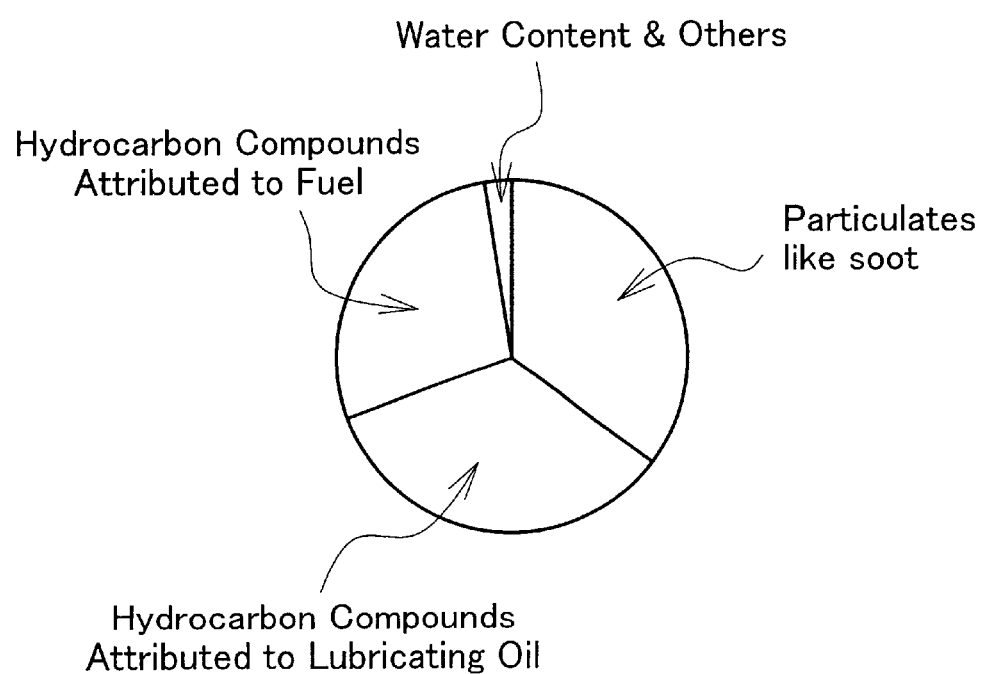
FIG. 7 shows the composition of exhaust gas from a Diesel engine including carbon-containing particulates and hydrocarbons.

As is known in the art, the exhaust gas from the Diesel engine includes the carbon-containing particulates and the hydrocarbon compounds at a ratio shown in FIG. 7. Roughly speaking, the exhaust gas includes practically similar fractions of the particulates like soot, the fuel-attributed hydrocarbon compounds, and the lubricant oil-attributed hydrocarbon compounds. The carbon-containing particulates like soot are not subjected to combustion at temperatures of lower than 550° C. even in the atmosphere of the oxygen-containing exhaust gas. It is expected, on the other hand, that the fuel-attributed hydrocarbon compounds and the lubricant oil-attributed hydrocarbon compounds are subjected to the oxidation reaction even at temperature of lower than 550° C. under the condition of a sufficient supply of oxygen.

The particulate filter 100 of the embodiment traps the particulates and the hydrocarbon compounds in the exhaust gas in a three-dimensionally dispersed manner inside the non-woven fabric. The trapped hydrocarbon compounds accordingly receive a sufficient supply of oxygen in the exhaust gas and starts a gentle oxidation reaction (exothermic reaction) with the heat of the exhaust gas. This gradually raises the filter temperature and causes accumulation of reactive intermediate products. When the total amount of the particulates and the hydrocarbon compounds trapped on the filter approaches a certain level, the filter temperature exceeds 550° C. and causes combustion of the particulates and the hydrocarbon compounds trapped on the filter.

Figure 8A:
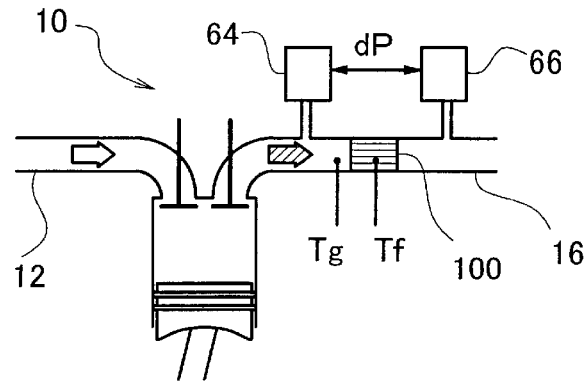
FIG. 8 conceptually shows the spontaneous regenerating function of an upstream particulate filter in the emission control device of the embodiment.
Figure 8B:
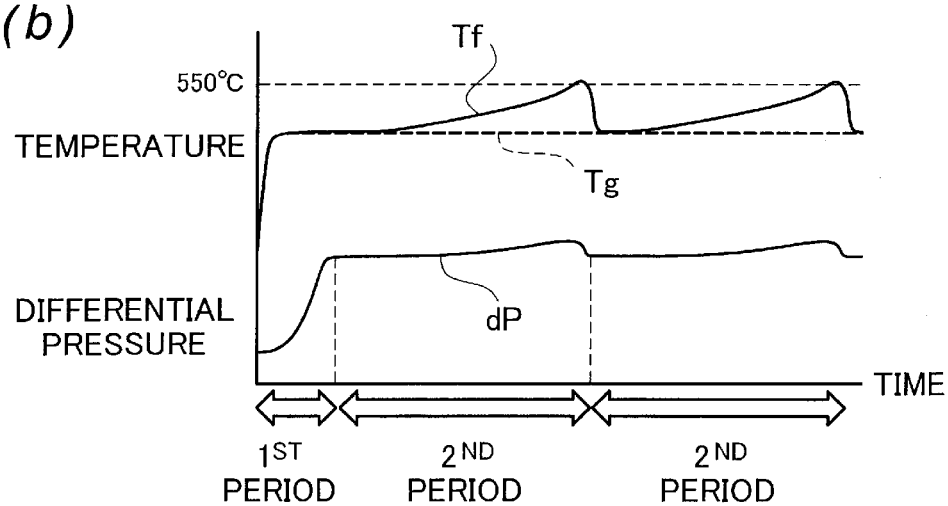

FIG. 8 conceptually shows spontaneous regeneration of the particulate filter 100 of the embodiment. FIG. 8(a) schematically shows the particulate filter 100 disposed in the exhaust pipe 16 of the Diesel engine 10. FIG. 8(b) shows the measurement results of differential pressure dP before and after the filter, temperature Tg of the exhaust gas flown into the filter, and filter temperature Tf, while the Diesel engine 10 is driven under fixed conditions. The differential pressure dP before and after the filter is measured with pressure sensors 64 and 66 arranged upstream and downstream of the filter.

When the Diesel engine 10 starts driving, the exhaust gas temperature Tg and the filter temperature Tf immediately rise to a stationary level. Although the filter temperature Tf is actually higher than the exhaust gas temperature Tg, for simplicity of explanation, it is assumed here that the two temperatures have no significant difference.

In the case of a new particulate filter 100, the differential pressure dP before and after the filter gradually increases and is eventually stabilized at a fixed value. The stable differential pressure before and after the filter at the fixed value is ascribed to the fact that the particulate filter 100 of the embodiment traps the particulates in the exhaust gas not only on the filter surface but inside the filter in a three-dimensional manner. The value of the stabilized differential pressure is varied mainly by the design dimensions of the filter, but is typically three to four times of the initial differential pressure. For convenience of explanation, the time period between the start of operation of the Diesel engine 10 and the stabilization of the differential pressure before and after the filter is called the 'first term'.

When the Diesel engine 10 continues driving after stabilization of the differential pressure before and after the filter, the filter temperature Tf starts a gentle rise, whereas the exhaust gas temperature Tg is not significantly varied. The deviation of the filter temperature Tf from the exhaust gas temperature Tg gradually increases, and the filter temperature Tf eventually reaches about 550° C. The differential pressure dP before and after the filter tends to slightly increase, due to the trapped particulates like soot and the hydrocarbon compounds on the filter, although the level of increase may be insignificant.

When the filter temperature Tf rises to 550° C., the soot and the other particulates trapped on the filter start combustion. On combustion of all the trapped particulates, the filter temperature Tf is immediately lowered to the level of the exhaust gas temperature Tg. In the case where the increase in differential pressure dP before and after the filter, due to trapping the soot and the other particulates in the exhaust gas, is detectable, a decrease in differential pressure dP, due to combustion of the soot and the other particulates trapped on the filter, is measurable. The time period subsequent to the first term when the filter temperature Tf is gradually deviated from the exhaust gas temperature Tg and again dropped to the exhaust gas temperature Tg is called the 'second term'. The first term is appreciably shorter than the second term. For clarity of illustration, the first term illustrated in FIG. 8 is longer than the actual length relative to the second term.

The filter temperature Tf is once lowered to the level of the exhaust gas temperature Tg on completion of combustion of the soot and the other particulates trapped on the filter, but again rises to 550° C. to start combustion of the trapped soot and the other particulates. Namely the filter is kept in the state of the second term to repeat trapping and combustion of the soot and the other particulates included in the exhaust gas. This is the first state of the spontaneous regenerating function of the particulate filter 100.

Figure 8C:
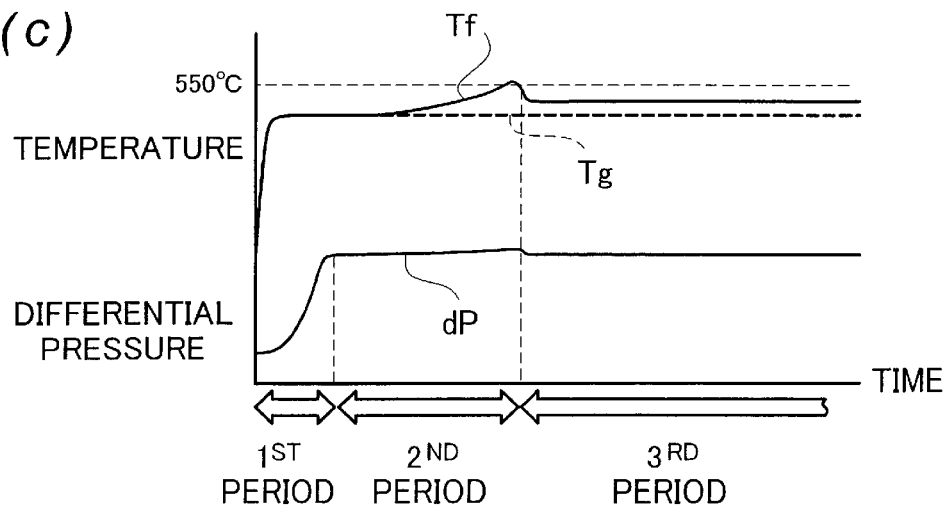

The second state of the spontaneous regenerating function appears under the condition of the higher exhaust gas temperature Tg. FIG. 8(c) shows variations in filter temperature Tf and in differential pressure dP before and after the filter when the Diesel engine 10 is driven under the condition of a litter higher exhaust gas temperature (typically, higher by 50° C.) than the condition of FIG. 8(b). This phenomenon is not restricted to the case of varying the exhaust gas temperature. Similar results are obtained when the density of soot is varied to be a little higher than the condition of FIG. 8(b).

Under the condition of the higher exhaust gas temperature Tg, the filter temperature Tf is not lowered to the level of the exhaust gas temperature Tg but is stabilized at a higher level after the second term as shown in FIG. 8(c). The time period subsequent to the second term when the filter temperature Tf is stabilized at a higher level than the exhaust gas temperature Tg is referred to as the 'third term'. In the third term, it is expected that trapping and combustion of the soot and the other particulates are locally repeated or that trapping and combustion proceed simultaneously at an identical location. In any case, the differential pressure dP before and after the filter is kept at a substantially fixed value in the third term as shown in FIG. 8(c). In the second state of the natural regenerating function, trapping and combustion of the particulates are carried out in parallel.

As described above, the particulate filter 100 disposed upstream of the turbine 21 has the non-woven fabric of the predetermined dimensions and dispersedly traps the carbon-containing particulates and the hydrocarbon compounds in the exhaust gas. The dispersedly trapped particulates are subjected to spontaneous combustion without any specific operations. The particulate filter 100 traps the soot and the other particulates in the dispersed manner, since the non-woven fabric actively takes in and traps the particulates according to some mechanism. The estimated trapping mechanism is described briefly.

FIG. 9 conceptually shows the cross sectional structure of a non-woven fabric of a heat-resistant metal. The hatched circles in the drawing respectively represent the cross sections of fibers of the non-woven fabric. The non-woven fabric is composed of countless fibers tangled intricately and has numerous three-dimensional pathways connecting with one another in a complicated manner.

Figure 9A:
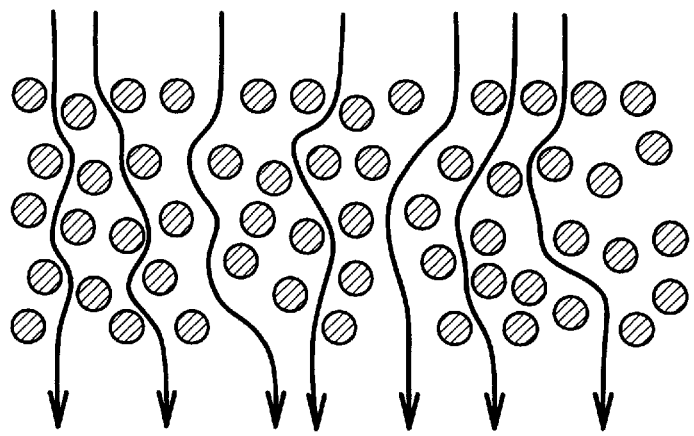
FIG. 9 conceptually shows a process of trapping carbon-containing particulates included in the flow of exhaust gas by means of the upstream particulate filter.

FIG. 9(a) conceptually shows the cross sectional structure of a new non-woven fabric. It is here assumed that the exhaust gas flows down. Because of the variation in distribution, of fibers, opening of various sizes are formed on the surface of the non-woven fabric. Even the small opening is sufficiently large for the gas molecules in the exhaust gas. The flow of the exhaust gas thus passes through the whole surface of the non-woven fabric in a practically uniform manner. In the drawing of FIG. 9(a), the flows of the exhaust gas between the fibers of the non-woven fabric are schematically expressed by the thick arrows.

Figure 9B:
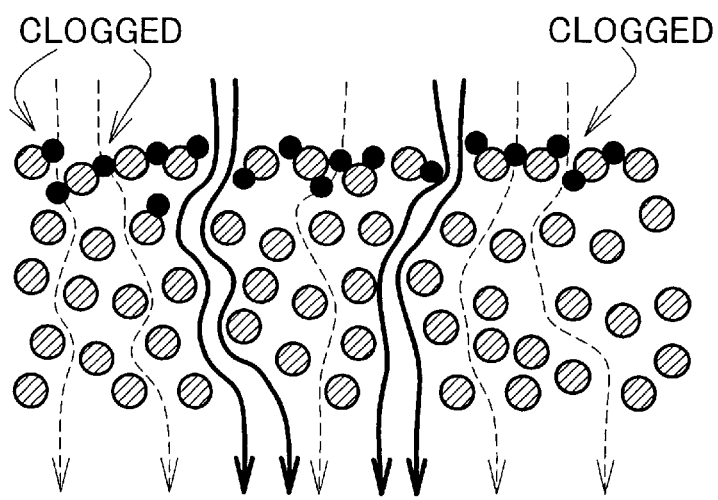

As the flow of the exhaust gas passes through the non-woven fabric, the particulates like soot included in the exhaust gas are trapped between the fibers and gradually clog the openings on the surface of the non-woven fabric. The small openings on the surface of the non-woven fabric are clogged with the particulates like soot, and the flows of the exhaust gas go to the non-clogged but remaining, relatively large openings as shown in FIG. 9(b). The flows of the exhaust gas passing through the non-woven fabric accordingly meet together to the flows from the non-clogged but remaining, relatively large openings on the surface. In the drawing of FIG. 9(b), the particulates like soot are schematically expressed by the small closed circles.

The integrated flow of the exhaust gas increases the flow rate and causes a significant pressure gradient in the pathway. This phenomenon may be explained by the collision of the flow against the fibers of the non-woven fabric to produce a large pressure. As mentioned previously, the pathways formed inside the non-woven fabric communicate with one another in an intricate manner. The higher pressure of the integrated flow in the pathway causes the flow to immediately branch off to the other pathways. The differential pressure before and after the non-woven fabric thus does not increase to or above a preset level but is kept in a fixed range.

Figure 9C:
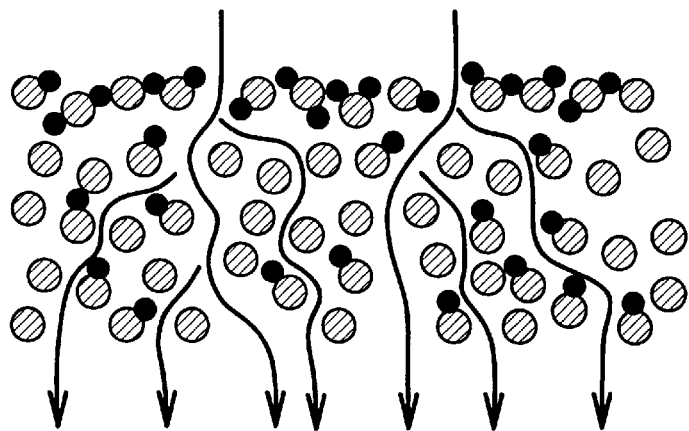

FIG. 9(c) conceptually shows the main stream branching off to the other pathways. As the flow of the exhaust gas branches off in the non-woven fabric, the carbon-containing particulates like soot included in the exhaust gas are trapped by the whole area of the non-woven fabric. Even if a certain place in the non-woven fabric is clogged with soot, the three-dimensional connection of the pathways allows the flow to immediately branch off to the other pathways. Namely even when a certain place in the non-woven fabric is clogged with soot and the other particulates, the flow path of the exhaust gas is automatically changed to new pathways. This arrangement ensures dispersed trapping of the soot and the other particulates.

As described above, the particulate filter 100 disposed upstream of the turbine 21 has the spontaneous regenerating function, and causes the trapped carbon-containing particulates and the hydrocarbon compounds in the exhaust gas to be subjected to spontaneous combustion without any special operations. The particulate filter 100 of this embodiment uses the metal non-woven fabric 106 to trap the particulates in the exhaust gas. The particulate filter 100 is, however, not restricted to the metal non-woven fabric but may be a ceramic filter like a cordierite honeycomb filter. The ceramic filter having the equivalent pore diameter distribution can exert the spontaneous regenerating function equivalent to that of the filter of the embodiment.

A-2-2. Complementary Function of Downstream Particulate Filter 200

The following describes the complementary function of the particulate filter 200 disposed downstream of the turbine 21 to complement the upstream particulate filter 100. As described above, the particulate filter 100 disposed upstream of the turbine 21 traps the carbon-containing particulates and the hydrocarbon compounds in the exhaust gas in a dispersed manner inside the non-woven fabric having the dimensions of the predetermined ranges shown in FIG. 4.

When the pore diameter of the non-woven fabric is excessively reduced to enhance the trapping rate of the particulates by the upstream particulate filter 100, the non-woven fabric has difficulty in actively taking in and dispersedly trapping the particulates as described above with reference to FIG. 9. When the upstream particulate filters 100 are used alone, a trace amount of the carbon-containing particulates included in the exhaust gas may pass through the filters. The downstream particulate filter 200 traps the carbon-containing particulates passing through the upstream particulate filters 100, thus significantly reducing the total quantity of the particulates released to the air.

Most of the carbon-containing particulates discharged from the Diesel engine 10 are trapped by the upstream particulate filters 100 having the spontaneous regenerating function, and the downstream particulate filter 200 traps only a trace amount of the carbon-containing particulates passing through the upstream filters. There is accordingly only a little amount of particulates accumulated on the downstream particulate filter 200. It is thus required to raise the temperature of the exhaust gas emitted from the Diesel engine 10 at rare intervals for combustion of the carbon-containing particulates accumulated on the downstream filter. A diversity of known techniques may be applied to raise the exhaust gas temperature. One applicable technique is intake air restriction that uses a valve in the intake pipe 12 of the Diesel engine 10 and narrows down the valve to raise the emission temperature. Another applicable technique delays the fuel injection timing behind an appropriate timing to raise the emission temperature. Although any technique naturally lowers the fuel consumption efficiency, the temperature rise at rare intervals does not significantly worsen the fuel consumption efficiency.

The downstream particulate filter 200 traps only a trace amount of the carbon-containing particulates and is not filled with the particulates even after use of a relatively long time. Replacement of the whole particulate filter 200 every when it is filled with the particulates is required only at rare intervals. Namely no large cost nor long time is required for the replacement. The particulate filter 200 may be mounted at a position that allows easy access for replacement, for example, at a certain position under the floor of the vehicle. An alternative application uses the particulate filter 200 of large dimensions, so that no replacement of the filter is required in the normal use conditions.

Using the downstream particulate filter 200 desirably enhances the degree of freedom in setting the upstream particulate filter. For the effective spontaneous regenerating function, it is effective to locate the particulate filter 100 on the upper stream side, for example, to locate the particulate filter 100 between the combustion chambers of the Diesel engine and the supercharger 20 if possible. The area closer to the combustion chamber may, however, not receive the particulate filter 100 of sufficient dimensions, because of the spatial restriction. In such cases, the presence of the downstream particulate filter 200 to complement the upstream particulate filter 100 sufficiently reduces the total quantity of the carbon-containing particulates released to the air.

Providing the downstream particulate filter 200 to complement the upstream particulate filter 100 effectively prevents the upstream particulate filter 100 from being clogged with ash. Here the ash represents metal components like Ca, Mg, and Zn included in additives of engine oil and combined with sulfur in the fuel to form sulfates and deposit as ash content. The metal sulfates are thermally very stable. Rising the exhaust gas temperature accordingly can not cause combustion of the ash accumulated on the filter. In the case where the fuel has a large sulfur content, it is desirable not to trap the ash but to make the ash penetrate the filter. Passage of the ash naturally leads to passage of the carbon-containing particulates through the filter. In the emission control device of the embodiment, the presence of the downstream particulate filter 200 effectively prevents an increase in quantity of the particulates released to the air, even in the case of an increase in quantity of the particulates passing through the upstream particulate filter 100. Namely the upstream particulate filter 100 may be constructed to allow passage of the ash, owning to the presence of the complementary downstream particulate filter 200. This arrangement effectively prevents the upstream particulate filter 100 from being clogged with the ash.

The ash penetrating the upstream filter reaches the downstream particulate filter 200. Because of the following reason, there is a relatively small amount of the ash accumulated on the downstream filter. The ash itself is a dry substance, but the hydrocarbon compounds included in the exhaust gas function like an adhesive and adhere to the non-woven fabric. The ash is successively accumulated on the hydrocarbon compounds, grows on the non-woven fabric, and eventually clogs the filter. As described previously, the upstream particulate filter 100 traps the carbon-containing particulates and the hydrocarbon compounds for combustion. There is accordingly only little amount of the hydrocarbon compounds functioning as the adhesive on the downstream particulate filter 200. This desirably prevents accumulation of the ash on the downstream particulate filter 200. Namely the upstream particulate filter 100 effectively works to prevent accumulation of the ash on the downstream particulate filter 200.

The arrangement of the particulate filter 200 downstream of the supercharger 20 as shown in FIG. 1 further prevents accumulation of the ash. The turbine 21 of the supercharger 20 generally rotates at a high speed of not less than 10,000 rotations per minute. The ash is accordingly crushed down to finer particles when passing through the turbine 21. The finer particles of the ash are not easily trapped by the filter and do not accumulate on the filter.

Because of the reasons discussed above, only little amount of the ash is accumulated on the downstream filter. The combination of the upstream particulate filter 100 with the complementary downstream particulate filter 200 effectively prevents the filters from being clogged with the ash. The downstream particulate filter 200 may be clogged with the ash after a long-time use. In such cases, the whole downstream particulate filter may be replaced. Replacement of the filter at rare intervals does not require so much cost or labor. On the assumption of replacement of the particulate filter 200, combustion of the carbon-containing particulates trapped by the downstream filter may be omitted. This desirably simplifies the whole system.

A-3. Modifications

In the emission control device of the first embodiment described above, a cordierite ceramic filter is applied for the downstream particulate filter 200. Like the upstream filter, the downstream particulate filter 200 may have the spontaneous regenerating function. In a modified example discussed below, a spontaneous regenerating filter having a slightly smaller setting of the pore diameter distribution than that of the upstream particulate filter 100 is applied for the particulate filter 200 disposed downstream of the turbine 21.

In the emission control device of the modified example, the carbon-containing particulates passing through the upstream particulate filter 100 are trapped by the downstream particulate filter 200. The carbon-containing particulates reaching the downstream particulate filter 200 are fine particles passing through the upstream particulate filter 100. The slightly smaller setting of the pore diameter distribution of the downstream particulate filter 200 than that of the upstream particulate filter 100 enables the particulates to be dispersedly trapped inside the filter according to the mechanism described above with reference to FIG. 8.

The hydrocarbon compounds and oxygen in the exhaust gas are consumed by the upstream particulate filter 100, and there is a less supply to the downstream particulate filter 200 compared with the upstream filter. The concentration of oxygen in the exhaust gas is significantly varied according to the driving conditions of the Diesel engine. In the actual state, the driving conditions are drastically varied, so that a sufficient quantity of oxygen may be supplied to the downstream particulate filter. It is also relatively easy to raise the concentration of the hydrocarbon compounds in the exhaust gas by matching the driving state of the engine. This also allows a sufficient quantity of the hydrocarbon compounds to be supplied to the downstream particulate filter 200.

The particulate filter 200, which is disposed downstream of the upstream particulate filter 100 and has the slightly smaller setting of the pore diameter distribution and the spontaneous regenerating function, traps the carbon-containing particulates passing through the upstream filter. This combination significantly reduces the total quantity of the particulates released to the air. As described above, both the upstream particulate filter 100 and the downstream particulate filter 200 have the spontaneous regenerating function and do not require any special treatment for combustion of the carbon-containing particulates trapped on the respective filters.

Figure 10:
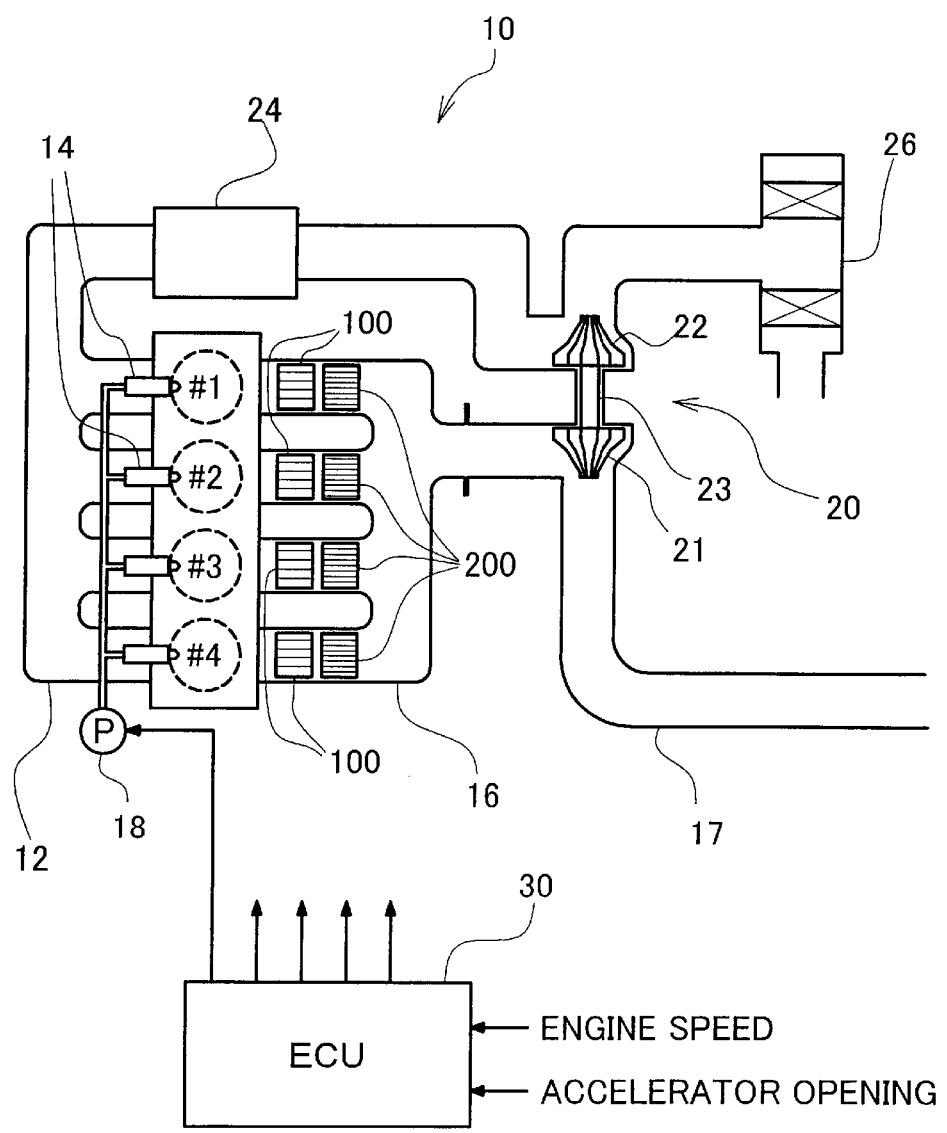
FIG. 10 shows another layout where the upstream particulate filter and the downstream particulate filter are located proximate to each other in another emission control device as one modified example of the first embodiment.

In this modified example, the downstream particulate filters 200 may be disposed immediately after the upstream particulate filters 100 as shown in FIG. 10. Such layout enables the exhaust gas of high temperature to be flown into the downstream particulate filters 200. This arrangement effectively utilizes the spontaneous regenerating function of the downstream particulate filters 200 for combustion of the trapped carbon-containing particulates.

Figure 11:
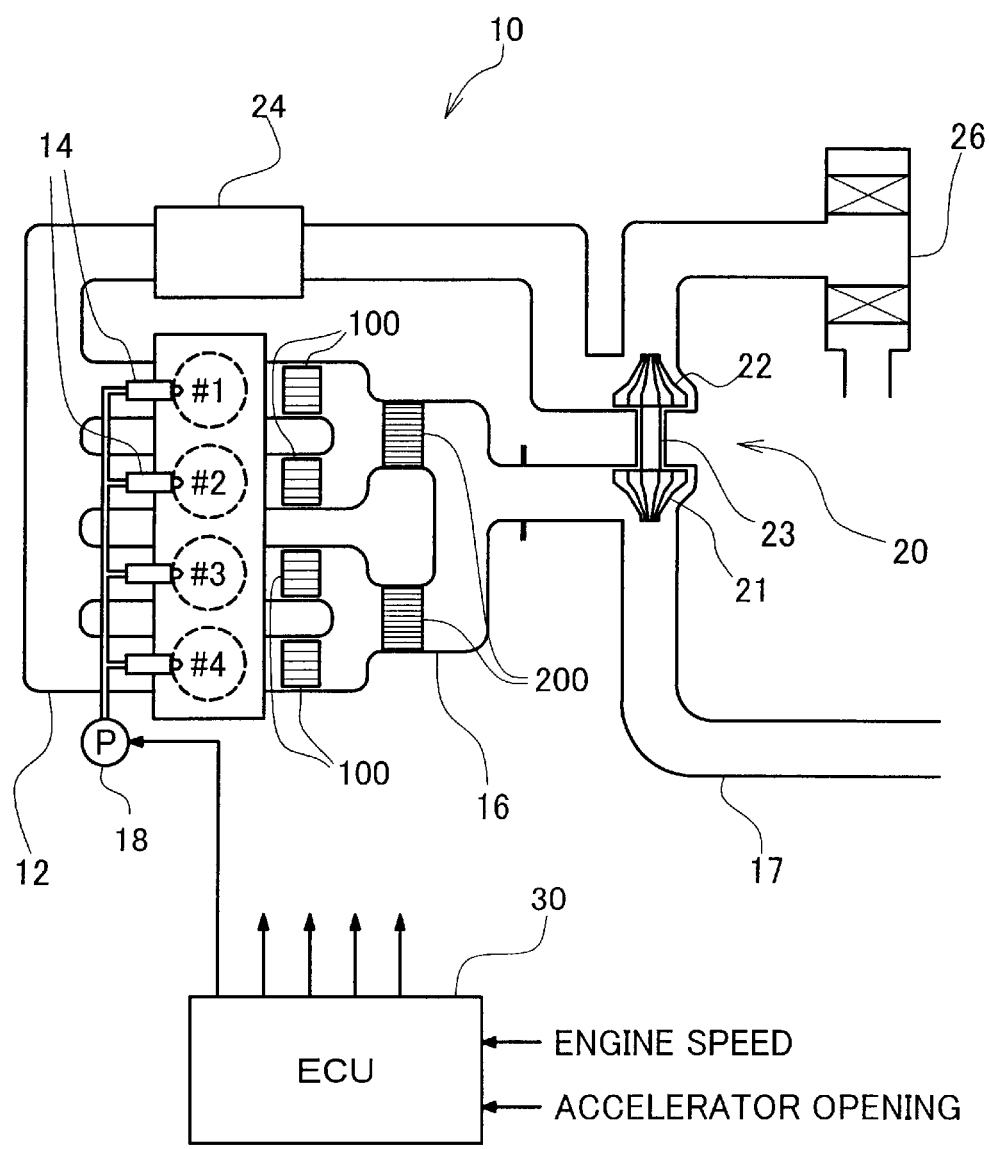
FIG. 11 shows still another layout where the downstream particulate filter is disposed at a joint of the flows of exhaust gas in still another emission control device as another modified example of the first embodiment.

In another layout shown in FIG. 11, the upstream particulate filter 100 is provided in each of multiple combustion chambers, whereas the downstream particulate filters 200 are provided at joints of the exhaust pathways from the multiple combustion chambers. The downstream particulate filters 200 of relatively large dimensions may be used in this arrangement.

B. Second Embodiment

B-1. System Construction

Figure 12:
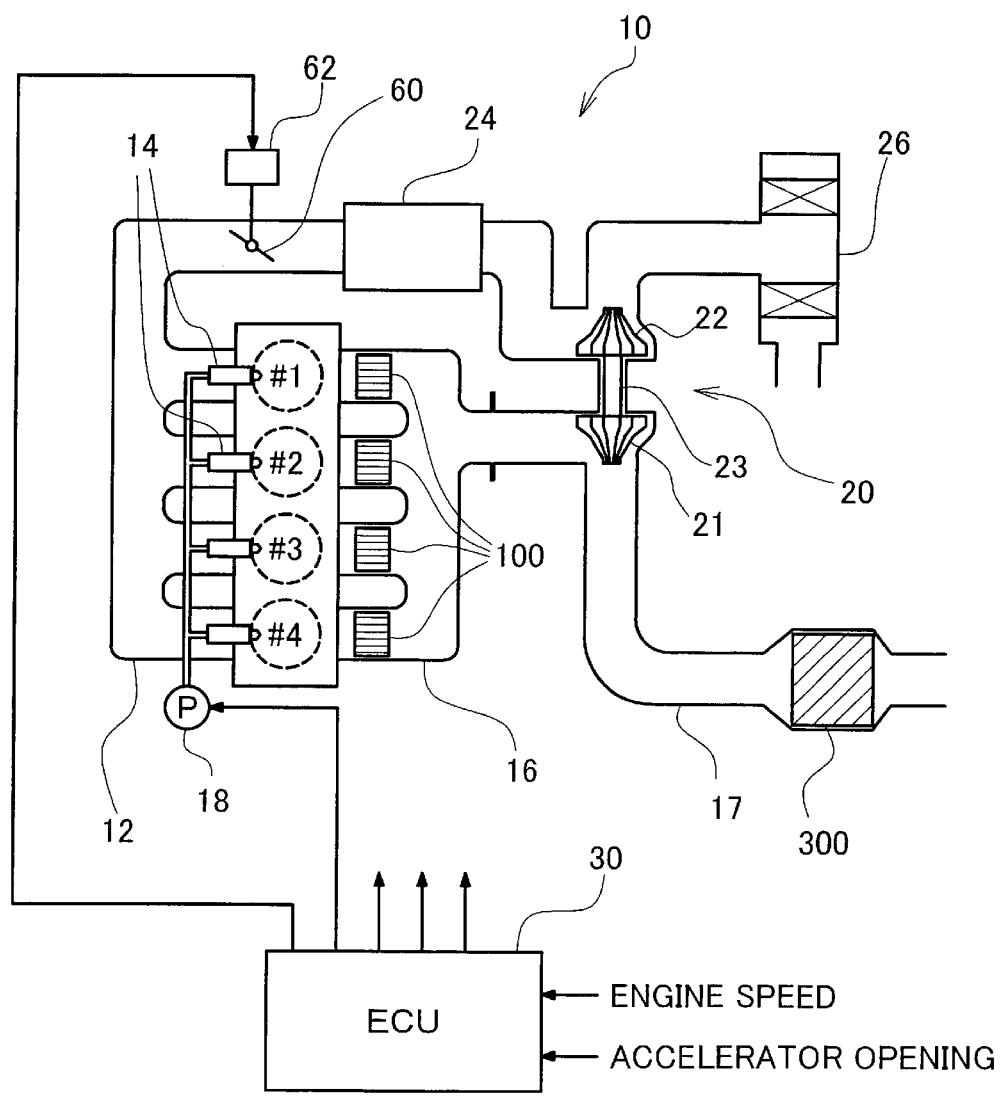
FIG. 12 illustrates the construction of the Diesel engine with an emission control device of a second embodiment applied thereto.

FIG. 12 conceptually illustrates an emission control device of a second embodiment applied to the Diesel engine 10. Main differences of the emission control device of the second embodiment from the first embodiment are that a cordierite particulate filter 300 with an active oxygen release agent carried thereon is used in place of the downstream particulate filter 200 of the first embodiment and that a throttle valve 60 is disposed in the intake pipe 12. The throttle valve 60 is driven by means of a step motor 62. The throttle valve 60 is fully open in the normal driving conditions, but is closed to a preset opening under control of the engine control ECU 30 in response to requirement of decreasing the concentration of oxygen in the exhaust gas. The concrete procedure of such control will be discussed later.

The active oxygen release agent carried on the particulate filter 300 of the second embodiment takes in and keeps oxygen in the presence of excess oxygen in its atmosphere, while releasing the intake oxygen in the form of active oxygen with a decrease in concentration of oxygen in the atmosphere. The active oxygen is much more reactive than the standard oxygen. The active oxygen can thus be utilized for easy combustion of the carbon-containing particulates trapped on the particulate filter 300.

In the emission control device of the second embodiment, the upstream particulate filters 100 having the spontaneous regenerating function and the downstream particulate filter 300 with the active oxygen release agent carried thereon function complimentarily to effectively reduce the carbon-containing particulates included in the exhaust gas.

B-1-1. Structure of Downstream Particulate Filter 300

Like the downstream particulate filter 200 of the first embodiment, the particulate filter 300 with the active oxygen release agent carried thereon is a ceramic filter of honeycomb structure. The structure of the particulate filter 300 of the second embodiment is briefly described with reference to FIG. 6, which shows the structure of the downstream particulate filter 200 of the first embodiment.

As shown in FIG. 6, the particulate filter 300 of the second embodiment also has the honeycomb structure and has a large number of pathways 202 formed therein. Fillers 204 are alternately attached to upstream ends or downstream ends of these pathways 202.

Figure 6B:
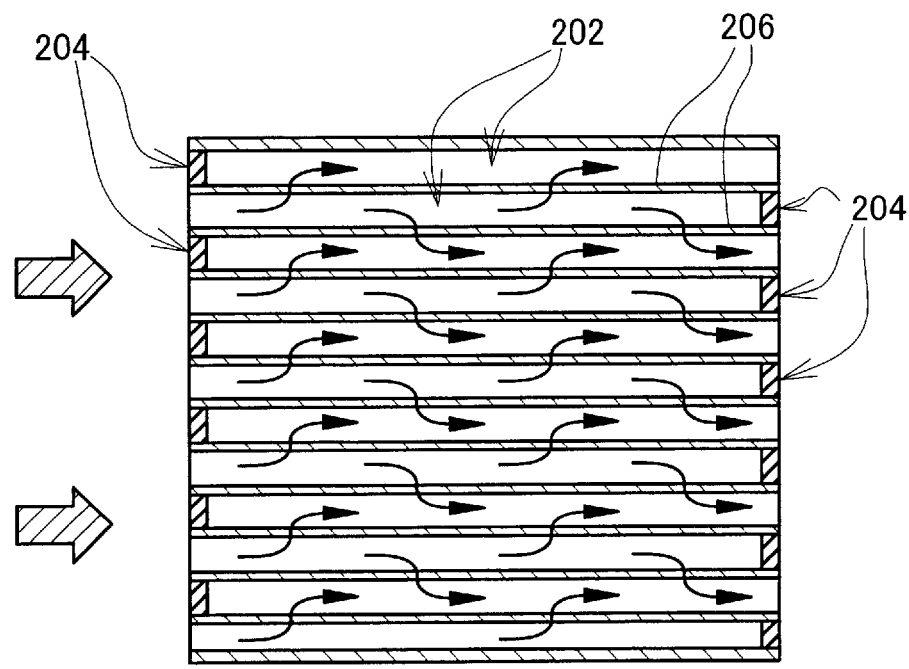

The flow of exhaust gas from the left side of FIG. 6(b) enters the particulate filter 300 through the pathways 202 without the fillers 204 on their upstream ends and passes through bulkheads 206 of the pathways 202 to the pathways 202 without the fillers 204 on their downstream ends as shown by the thick arrows. Cordierite has the porous structure formed in the process of calcination. As the flow of exhaust gas passes through the porous structure of the bulkheads 206, the porous structure traps the carbon-containing particulates in the exhaust gas.

A base material layer mainly composed of alumina is formed on the surface of the porous structure of the cordierite bulkheads 206, and a noble metal catalyst and the active oxygen release agent are carried on the base material layer. Platinum Pt is mainly used as the noble metal catalyst, although another metal having oxidation activity like palladium Pd may be applied. Typical examples of the active oxygen release agent include alkaline metals, such as potassium K, sodium Na, lithium Li, cesium Cs, and rubidium Rb, alkaline earth metals, such as barium Ba, calcium Ca, and strontium Sr, rare earth elements, such as lanthanum La, yttrium Y, and cerium Ce, and transition metals. Especially the alkaline metals and the alkaline earth metals having the higher ionicity than calcium Ca, that is, potassium K, lithium Li, cesium Cs, rubidium Rb, barium Ba, and strontium Sr are preferably used for the active oxygen release agent.

B-1-2. Active Oxygen Release Function of Particulate Filter 300

The following briefly describes how the particulate filter 300 of the second embodiment with the active oxygen release agent carried thereon takes in excess oxygen in the exhaust gas and releases the intake oxygen in the form of active oxygen.

FIG. 13 conceptually shows the surface of the porous structure of the particulate filter 300. An active oxygen release agent 302 like potassium K or barium Ba and a noble metal catalyst 304 like platinum Pt are carried on the surface of the porous structure of the particulate filter 300. The noble metal catalyst 304 like platinum Pt is in the form of particles having the particle diameter of not greater than 1 $\mu$m and is homogeneously dispersed on the active oxygen release agent 302.

Figure 13A:
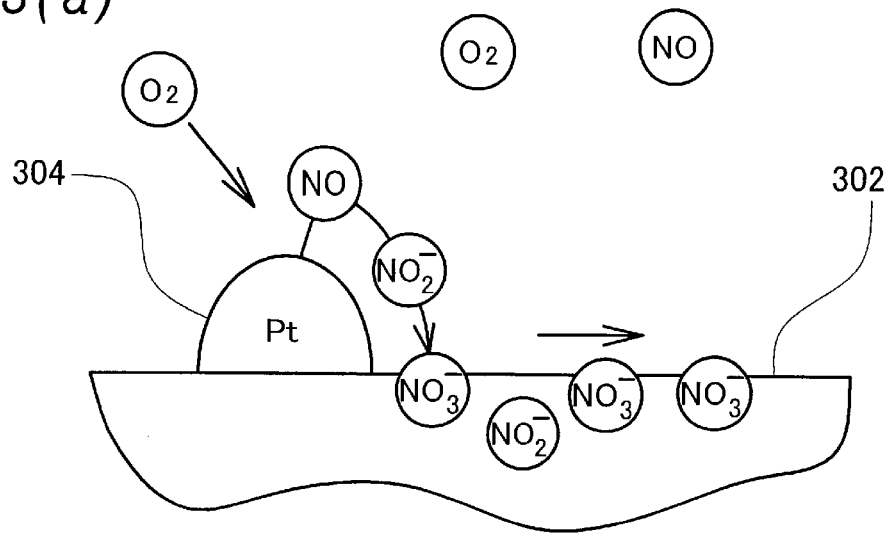
FIG. 13 conceptually shows the active oxygen release function of a downstream particulate filter in the emission control device of the second embodiment.

FIG. 13(a) conceptually shows a process that the active oxygen release agent 302 takes in excess oxygen included in the exhaust gas. The exhaust gas includes nitrogen oxides generated through combustion. The nitrogen oxides are included mostly in the form of nitrogen monoxide NO, and are thus expressed as nitrogen monoxide NO in FIG. 13. Nitrogen monoxide NO is a polar molecule, and NO in the exhaust gas is thus quickly adsorbed on platinum Pt. Pt has relatively high oxidation activity, so that NO reacts with oxygen in the exhaust gas on Pt to be oxidized to nitrate ion $NO_3-$ via nitrite ion $NO_2-$ and is taken in the form of nitrates into the active oxygen release agent 302. The nitrate ion $NO_3-$ on Pt shifts to the active oxygen release agent 302 by a phenomenon called 'spillover'. The 'spillover' phenomenon is that the adsorbed molecules actively move around on the catalyst. The particles of Pt or another metal are dispersed on the catalyst in a homogeneous manner, but are still localized in the molecular level. The spillover phenomenon causes the adsorbed molecules to actively move around on the surface of the catalyst. The whole surface accordingly functions as the catalyst. In the presence of excess oxygen in the exhaust gas, NO is oxidized on Pt and is shifted to the active oxygen release agent 302 by the spillover phenomenon to be stored in the form of nitrates with excess oxygen. In the above description, it is assumed that carbon monoxide adsorbed on Pt is all oxidized to the nitrate ion $NO_3-$. In the actual state, however, carbon monoxide may not be all oxidized to the nitrate ion $NO_3-$, but may be partly stored in the form of nitrites.

Figure 13B:
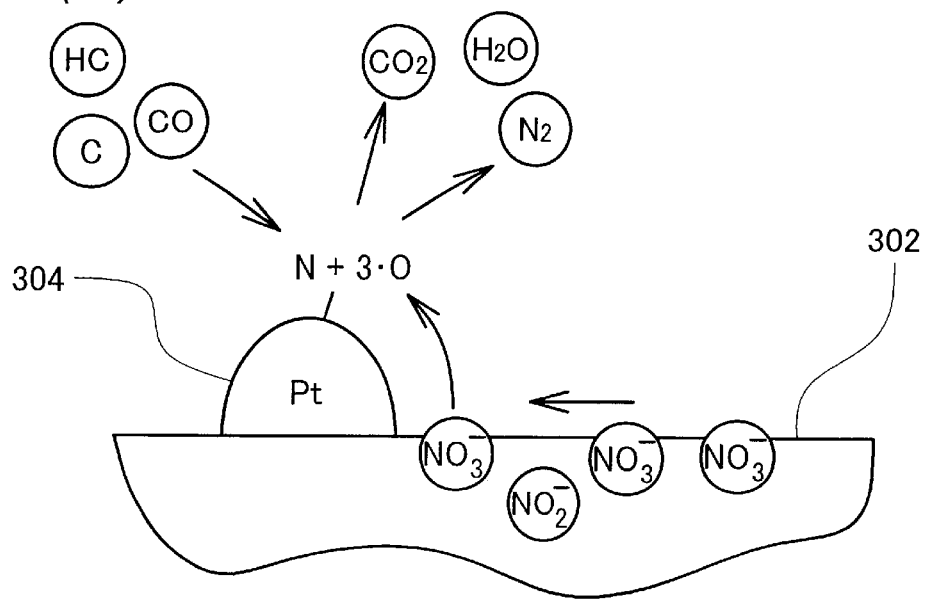

FIG. 13(b) conceptually shows a process that the active oxygen release agent 302 releases oxygen stored with NO in the form of active oxygen with a decrease in concentration of oxygen in the exhaust gas. The exhaust gas includes reducing substances, such as hydrocarbon compounds and carbon monoxide. The carbon-containing particulates like soot also function as the reducing substances. In the drawing of FIG. 13(b), the hydrocarbon compounds are expressed as HC, and the carbon-containing particulates like soot are expressed as carbon C. As mentioned previously, Pt has the high oxidation activity and accelerates oxidation of such reducing substances in the presence of oxygen in the exhaust gas to carbon dioxide $CO_2$ and water.

In the absence of a sufficient quantity of oxygen relative to the reducing substances, however, as shown in FIG. 13(b), Pt decomposes the nitrate ion $NO_3-$ or nitrite ion $NO_2-$ stored in the active oxygen release agent 302 and oxidizes the reducing substances with active oxygen produced in the course of decomposition. This phenomenon is explained with reference to FIG. 13(b). The nitrate ion $NO_3-$ (or nitrite ion $NO_2-$) stored in the active oxygen release agent 302 shifts onto Pt by the spillover phenomenon. The electron cloud of the nitrate ion $NO_3-$ is attracted by Pt to be localized. Such localization weakens the chemical bonding of nitrogen atom to oxygen atoms in the nitrate ion $NO_3-$. In the drawing of FIG. 13(b), the nitrate ion is expressed as 'N+3.O', which schematically represents the weak bonding of nitrogen atom to oxygen atoms. Action of the reducing substances in this state cuts the bonding of nitrogen atom to oxygen atom and produces active oxygen. Active oxygen is extremely reactive and quickly reacts with the hydrocarbon compounds, carbon monoxide, and the carbon-containing particulates like soot in the exhaust gas so as to convert them into carbon dioxide $CO_2$ and water.

The particulate filter 300 of the second embodiment takes in oxygen in the presence of excess oxygen in the exhaust gas, while releasing the intake oxygen in the form of active oxygen in the absence of oxygen. Conversion of the carbon-containing particulates with the active oxygen into carbon monoxide and water effectively reduces the carbon-containing particulates trapped on the filter.

B-2. Function of Regulating and Reducing Carbon-Containing Particulates in Second Embodiment As described above, the emission control device of the second embodiment uses the combination of the upstream particulate filters 100 having the spontaneous regenerating function with the downstream particulate filter 300 having the active oxygen release function. The combination complements the respective functions and effectively reduces the carbon-containing particulates included in the exhaust gas.

In the normal driving state, excess oxygen is present in the exhaust gas emitted from the Diesel engine. The carbon-containing particulates and the hydrocarbon compounds in the exhaust gas are trapped in a dispersed manner by the upstream particulate filters 100. As described previously, the particulate filters 100 have the spontaneous regenerating function to slowly oxidize the trapped hydrocarbon compounds with oxygen in the exhaust gas for combustion of the trapped carbon-containing particulates.

Under the normal driving conditions, the exhaust gas contains excess oxygen, so that the downstream particulate filter 300 takes oxygen in the exhaust gas together with nitrogen oxides into the active oxygen release agent in the form of nitrates (or nitrites). The downstream particulate filter 300 also traps a trace amount of the carbon-containing particulates passing through the upstream particulate filters 100.

In the emission control device of the second embodiment, the upstream particulate filters 100 trap most of the carbon-containing particulates. There is thus practically no possibility that a large quantity of the particulates are accumulated on the downstream particulate filter 300. If the exhaust gas contains a large quantity of the carbon-containing particulates like soot, the noble metal, such as Pt, having the catalytic action is covered with soot. This prevents oxygen and the nitrogen oxides in the exhaust gas from being taken in the form of nitrates. This state is called carbon poisoning. The soot covering over Pt is initially amorphous carbon but is eventually deformed to stable graphite, which may not be successfully burned up with the heat of the exhaust gas. In the emission control device of the second embodiment, however, the upstream particulate filters 100 trap most of the carbon-containing particulates, and the downstream particulate filter 100 is required to trap only a trace amount of the particulates passing through the upstream filters and is thus free from carbon poisoning.

In the emission control device of the second embodiment, the carbon-containing particulates passing through the upstream particulate filters 100 are trapped by the downstream particulate filter 300. This combination significantly reduces the total amount of the carbon-containing particulates released to the air.

After the Diesel engine 10 is driven for some time, the throttle valve 60 is partly closed under control of the engine control ECU 30 to decrease the concentration of oxygen in the exhaust gas. Under the normal driving conditions, the amount of intake air is greater than the amount of fuel injected into the combustion chamber. There is accordingly excess oxygen. When the throttle valve 60 is partly closed to decrease the amount of intake air, practically all the intake oxygen is used up. Closing the throttle valve 60 to an excess level, however, results in an insufficient amount of the intake air to drastically lower the output or to cause failure of combustion of the injected fuel. The engine control ECU 30 thus regulates the opening of the throttle valve 60 to take in an appropriate quantity of the air including a necessary and sufficient amount of oxygen, based on information regarding the engine speed and the accelerator opening. For simplicity of explanation, it is here assumed that the throttle valve 60 is closed at regular intervals. In the actual state, however, the throttle valve 60 is controlled at adequate timings by taking into account the accumulation of the exhaust gas emitted from the engine and the engine driving conditions.

With a decrease in concentration of oxygen in the exhaust gas, the nitrate ion stored in the active oxygen release agent 302 on the downstream particulate filter 300 is decomposed on Pt and produces active oxygen, which reacts with the particulates trapped on the filter. This causes the carbon-containing particulates trapped on the filter to be converted into carbon dioxide and water, while the nitrate ion loses oxygen on Pt and is thus converted to harmless nitrogen. These harmless substances are then released to the exhaust gas.

Under the normal driving conditions where excess oxygen is present in the exhaust gas, the particulate filter 300 traps the carbon-containing particulates and takes in the nitrogen oxides in the exhaust gas together with oxygen in the form of nitrates. Under the conditions where oxygen in the exhaust gas is deficient, the particulate filter 300 converts the trapped carbon-containing particulates and the intake nitrogen oxides into harmless substances like nitrogen and water. The particulate filter 300 traps a trace amount of carbon-containing particulates passing through the upstream particulate filters 100, so as to lower the total quantity of the carbon-containing particulates released to the air, while regulating and reducing the nitrogen oxides that have not been treated on the upstream particulate filter 100.

Even if a large amount of carbon-containing particulates are discharged from the Diesel engine 10, most of the particulates are trapped by the upstream particulate filters 100, whereas a trace amount of the particulates reach the downstream particulate filter 300. Even in such cases, the downstream particulate filter 300 is free from carbon poisoning and can efficiently reduce the carbon-containing particulates and nitrogen oxides included in the exhaust gas.

C. Third Embodiment

Figure 14:
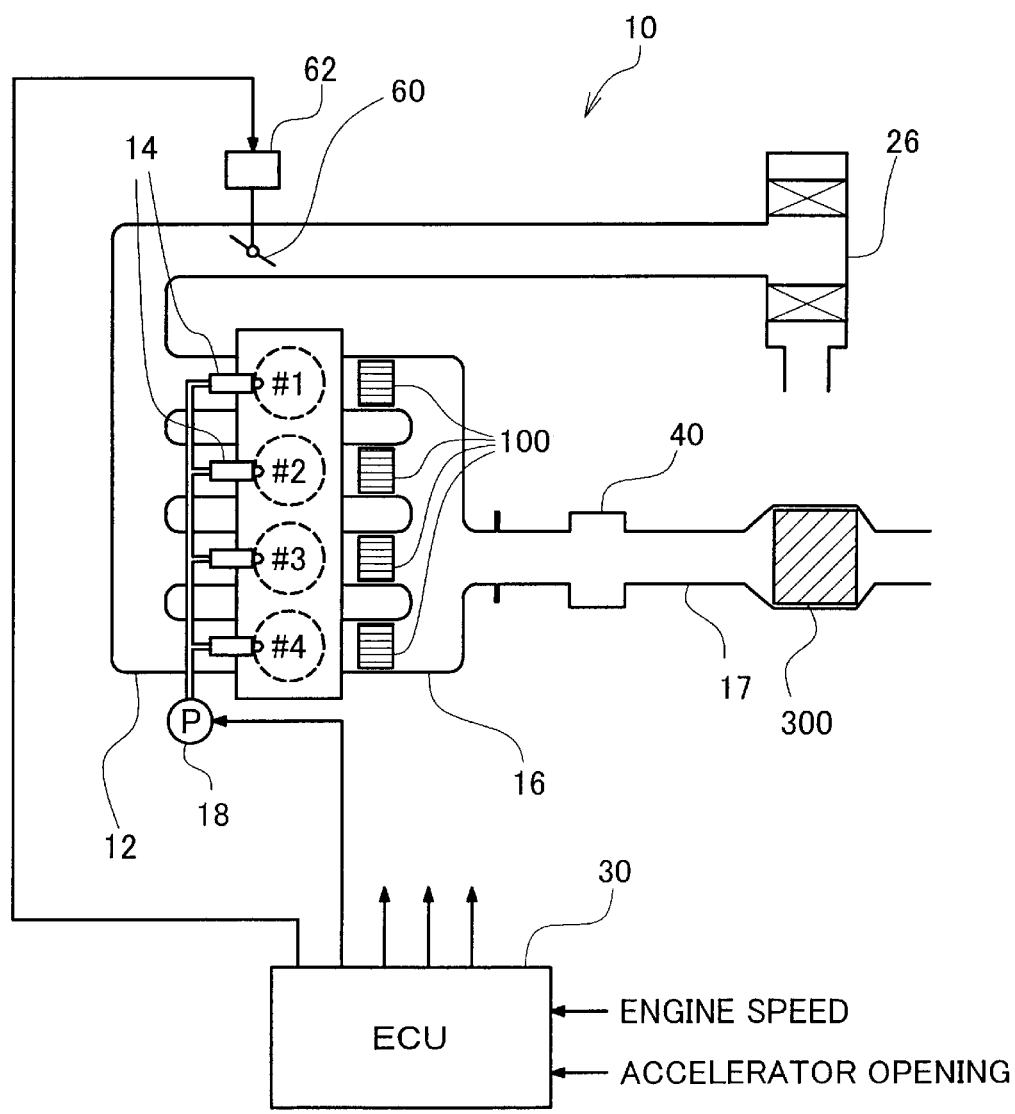
FIG. 14 illustrates the construction of the Diesel engine with an emission control device of a third embodiment applied thereto.

FIG. 14 conceptually illustrates an emission control device of a third embodiment applied to the Diesel engine 10. As illustrated, a main difference of the emission control device of the third embodiment from the emission control device of the second embodiment is that the supercharger 20 is replaced by a surge tank 40 for relieving a variation in flow rate. In the emission control device of the third embodiment, the surge tank 40 is located downstream of the particulate filters 100 having the spontaneous regenerating function, and the particulate filter 300 with the active oxygen release agent carried thereon is located further downstream of the surge tank 40.

In the emission control device of the third embodiment having the above construction, the exhaust gas emitted from the Diesel engine 10 is flown with a variation in flow rate into the upstream particulate filters 100. Large carbon-containing particulates in the exhaust gas collide with and adhere to the metal fibers constituting the particulate filters 100. The particulate filters 100 can thus effectively trap these particulates. The exhaust gas passing through the particulate filters 100 is flown into the surge tank 40, where the variation in flow rate is relieved. This is ascribed to the following phenomenon. In general, when a fluid flowing in a narrow pathway is discharged to a chamber of a large volume, for example, a surge tank, the abrupt expansion of the area of the pathway causes an abrupt decrease in flow rate. The decreased flow rate is converted into a pressure. Unless the surge tank has an extremely small volume, the pressure in the tank is not drastically varied as the variation in flow rate. The flow rate of the fluid out of the surge tank to a downstream pathway is thus not significantly varied as the flow rate of the fluid into the surge tank. Namely the conversion of the flow rate into the pressure effectively relieves the variation in flow rate.

In the emission control device of the third embodiment, the exhaust gas passing through the particulate filters 100 has the relieved variation in flow rate by means of the surge tank 40 and is flown into the downstream particulate filter 300. As described previously, the particulate filter 300 has the porous structure, which traps the carbon-containing particulates while the flow of exhaust gas passes through the filter. The exhaust gas having the relieved variation in flow rate by means of the surge tank 40 is flown into the downstream particulate filter 300. The downstream particulate filter 300 can thus efficient trap the fine carbon-containing particulates as described above.

The exhaust gas is flown with the variation in flow rate into the upstream particulate filters 100. This enables trapping of finer carbon-containing particulates, because of the reason described above. There is accordingly very little possibility that relatively large carbon-containing particulates are flown into the downstream particulate filter 300 and clog the filter. By taking into account this advantage, the particulate filter 300 may be constructed to have finer pores and trap finer carbon-containing particulates. Since the variation in flow rate is relieved, the finer carbon-containing particulates do not move around on the surface of the particulate filter 300 due to the variation in flow rate but are trapped immediately. This effectively prevents secondary aggregation of the particulates to a greater size to clog the particulate filter 300.

The downstream particulate filter 300 additionally traps the fine carbon-containing particulates, which are quickly treated with active oxygen released from the active oxygen release agent 302 carried on the filter. The quick treatment of the trapped particulates allows trapping of newly inflow particulates and thereby enhances the trapping efficiency of the particulates.

C-1. Modifications

Figure 15A:
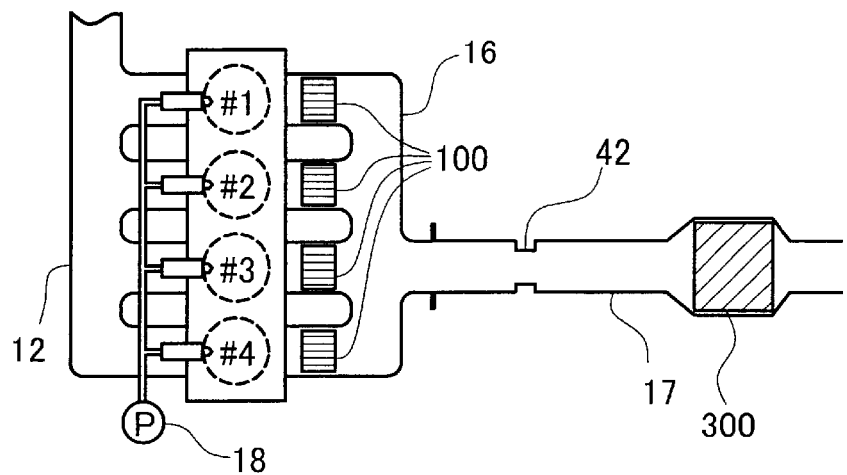
FIG. 15 conceptually shows various modifications in the emission control device of the third embodiment.
Figure 15B:
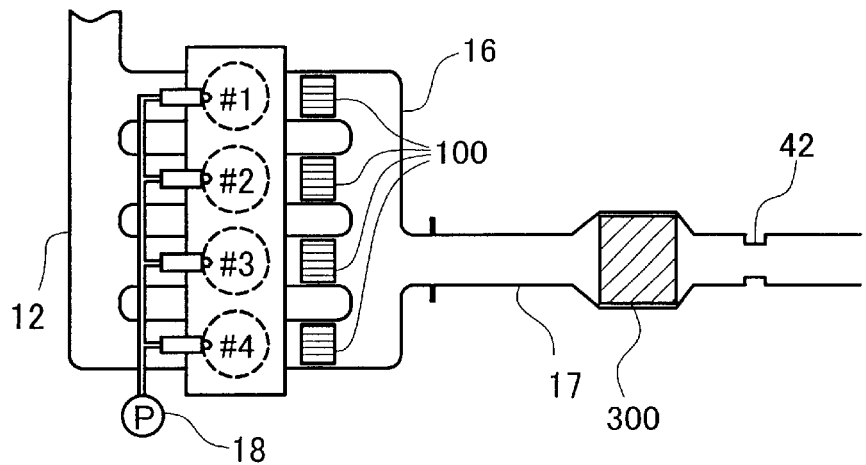
Figure 15C:
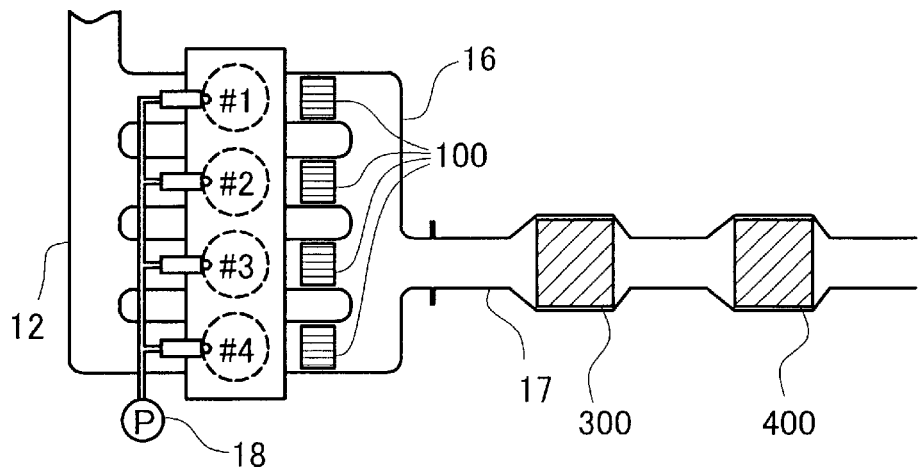

The emission control device of the third embodiment may be actualized in a diversity of applications. FIG. 15 conceptually shows various modifications. In the structure of FIG. 14, the surge tank 40 is disposed between the upstream particulate filters 100 and the downstream particulate filter 300 as the means of relieving the variation in flow rate. As shown in FIG. 15(*a*), the surge tank 40 may be replaced with a flow-restriction element like an orifice 42. The flow-restriction element interferes with transmission of the variation component of the flow rate to the downstream side of the flow-restriction element, thus relieving the variation in flow rate of the exhaust gas flown into the downstream particulate filter 300. The supercharger 20 may be provided, in place of the orifice 42. Like the orifice 42, the supercharger 20 functions as the flow-restriction element and relieves the variation in flow rate of the exhaust gas flown into the downstream particulate filter 300.

As shown in FIG. 15(*b*), the flow-restriction element like the orifice 42 may be located downstream of the particulate filter 300. The exhaust gas has difficulty in passage through the flow-restriction element like the orifice 42, so that the variation in flow rate is not directly transmitted to the downstream side of the flow-restriction element. The variation component of the flow rate is thus converted into a pressure variation in the upstream side of the flow-restriction element. Because of the restriction by the orifice 42, the increasing flow rate on the upstream side of the orifice 42 can not be directly transmitted through the orifice 42 and thereby increases the pressure on the upstream side of the orifice 42. The increased pressure is lowered again with recovery of the flow rate to the previous level on the upstream side of the orifice 42. At least part of the variation in flow rate is converted into a pressure variation on the upstream side of the flow-restriction element like the orifice 42. This ensures the relieved variation in flow rate on the upstream of the flow-restriction element. Namely the flow-restriction element like the orifice 42 provided downstream of the particulate filter 300 as shown in FIG. 15(*b*) preferably relieves the variation in flow rate of the exhaust gas flown into the particulate filter 300.

A small-sized control catalyst (for example, an oxidation catalyst) 400 for controlling the emission may be provided, in place of the flow-restriction element like the orifice 42 as shown in FIG. 15(*c*). The control catalyst 400 has flow resistance and thus relieves the variation in flow rate of the exhaust gas flown into the particulate filter 300 according to a similar mechanism to the mechanism with the flow-restriction element like the orifice 42. The control catalyst 400 provided as the flow-restriction element additionally reduces air pollutants passing through the particulate filter 300. As described above, the particulate filter 300 traps the carbon-containing particulates in the exhaust gas and utilizes active oxygen for regulation and reduction of the trapped carbon-containing particulates. The particulate filter 300 may, however, not effectively trap gaseous air pollutants like SOF but may allow passage of such air pollutants. The control catalyst 400 provided as the flow-restriction element downstream of the particulate filter 300 reduces the air pollutants passing through the particulate filter 300. The control catalyst 400 can also reduce intermediate products (for example, carbon monoxide), which are produced in the course of combustion of the carbon-containing particulates and are leaked from the particulate filter 300 under certain conditions.

Figure 16:
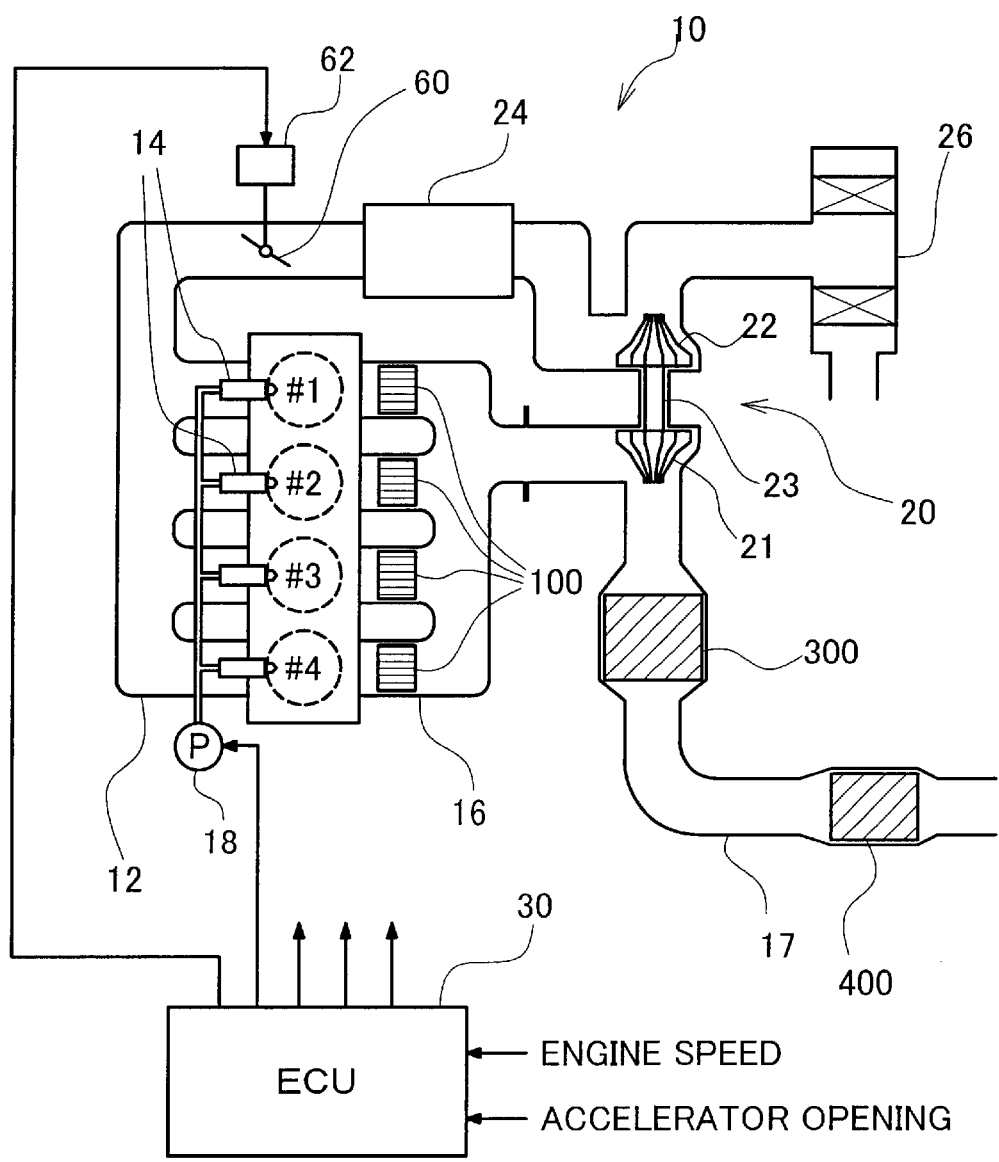
FIG. 16 conceptually shows another modification in the emission control device of the third embodiment.
Figure 17A:
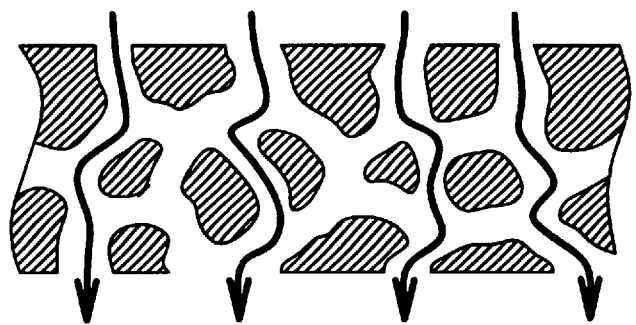
FIG. 17 shows the principle of causing collision and adhesion of the carbon-containing particulates included in the flow of exhaust gas and thereby trapping the carbon-containing particulates.
Figure 17B:
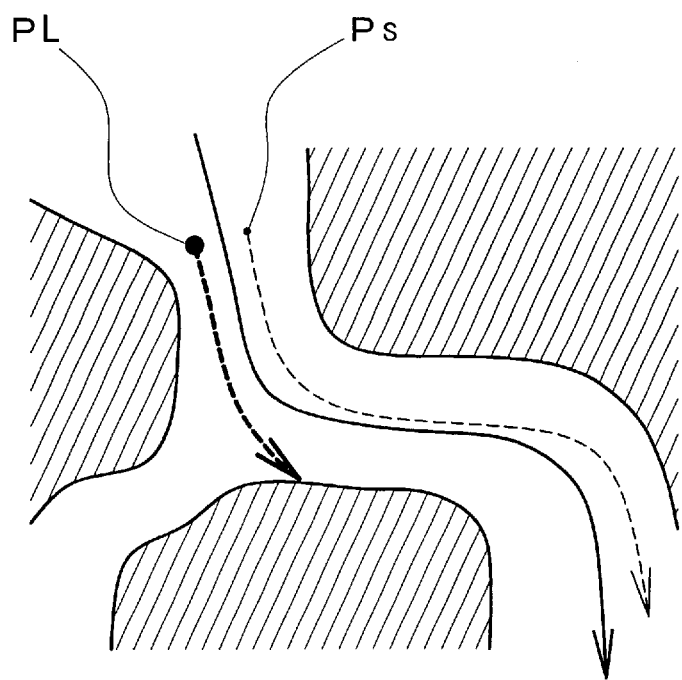

In the modified example shown in FIG. 15, the flow-restriction element, such as the surge tank 40 or the orifice 42, is disposed either downstream or upstream of the particulate filter 300. The flow-restriction element may be some combination of these flow-restriction elements. FIG. 16 shows one example of such combination. In this example, the supercharger 20 as the flow-restriction element is disposed upstream of the particulate filter 300, and the small-sized control catalyst 400 as the flow-restriction element is disposed downstream of the particulate filter 300. The Diesel engine is generally provided with a supercharger for higher output. The supercharger 20 is thus used as the flow-restriction element on the upstream side of the particulate filter 300, while the control catalyst 400 is used as the flow-restriction element on the downstream side of the particulate filter 300. The upstream flow-restriction element also functions as the supercharger, and the downstream flow-restriction element functions as the control catalyst. This arrangement attains the totally effective configuration.

The above embodiments and their modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

For example, in the above embodiment, the particulate filter may have the metal non-woven fabric. Another known filter like a ceramic filter may be applicable for the particulate filter.

In the embodiments discussed above, the Diesel engine 10 is provided with the supercharger 20. The arrangements of the respective embodiments are, however, also applicable to the Diesel engine without the supercharger.

INDUSTRIAL APPLICABILITY

As described above, in the emission control device of the present invention, the upstream particulate filter and the downstream particulate filter function complimentarily to ensure effective and efficient regulation and reduction of the carbon-containing particulates in the exhaust gas. The technique of the present invention is thus preferably applied to the emission control devices that reduce the emission from various internal combustion engines, as well as the emission control devices for a diversity of vehicles and ships with internal combustion engines as the power source. The technique of the invention is also applicable to stationary internal combustion engines.

What is claimed is:

1. An emission control device that reduces carbon-containing particulates included in a flow of exhaust gas from an internal combustion engine, that comprises a plurality of combustion chambers, an exhaust manifold that unites flows of exhaust gas from said plurality of combustion chambers to at least one joint flow, and an exhaust pipe that leads the joint flow of exhaust gas united by said exhaust manifold to the air, said emission control device comprising:

a first heat-resistant filter medium that traps hydrocarbon compounds and the carbon-containing particulates included in the flow of exhaust gas in a dispersive manner to bring the respective particulates and hydrocarbon compounds in contact with oxygen included in the exhaust gas, and thereby makes the trapped hydrocarbon compounds and the trapped carbon-containing particulates subjected to combustion with the exhaust gas having a filter inflow temperature lower than a combustible temperature of the carbon-containing particulates, said first heat-resistant filter medium being disposed in said exhaust manifold, and a second heat-resistant filter medium that traps the remaining carbon-containing particulates, which have not been trapped by said first heat-resistant filter medium but have passed through said first heat-resistant filter medium, said second heat-resistant filter medium being disposed in said exhaust pipe.

2. An emission control device in accordance with claim 1, wherein said second heat-resistant filter medium is capable of trapping the remaining carbon-containing particulates, which are smaller in size than the carbon-containing particulates collectable by said first heat-resistant filter medium.

3. An emission control device in accordance with claim 1, wherein said first heat-resistant filter medium is disposed at a specific position where the flows of exhaust gas from said plurality of combustion chambers are united to the at least one joint flow, in said exhaust manifold.

4. An emission control device that reduces carbon-containing particulates included in a flow of exhaust gas from an internal combustion engine, that comprises a plurality of combustion chambers, an exhaust manifold that unites flows of exhaust gas from said plurality of combustion chambers to at least one joint flow, and an exhaust pipe that leads the joint flow of exhaust gas united by said exhaust manifold to the air, said emission control device comprising:

a first heat-resistant filter medium that traps hydrocarbon compounds and the carbon-containing particulates included in the flow of exhaust gas in a dispersive manner to bring the respective particulates and hydrocarbon compounds in contact with oxygen included in the exhaust gas, and thereby makes the trapped hydrocarbon compounds and the trapped carbon-containing particulates subjected to combustion with the exhaust gas having a filter inflow temperature lower than a combustible temperature of the carbon-containing particulates; and said first heat-resistant filter medium being disposed in said exhaust manifold, and a second heat-resistant filter medium that traps the remaining carbon-containing particulates, which have not been trapped by said first heat-resistant filter medium but have passed through said first heat-resistant filter medium, said second heat-resistant filter medium being disposed in said exhaust pipe;

wherein said first heat-resistant filter medium does not trap most of metal sulfate particulates but allows passage of the metal sulfate particulates therethrough, the metal sulfate particulates being produced from metal components added to lubricating oil of said internal combustion engine and sulfur in a fuel of said internal combustion engine and being suspended in the flow of exhaust gas.

5. An emission control device that reduces carbon-containing particulates included in a flow of exhaust gas from an internal combustion engine, said emission control device comprising:

a first heat-resistant filter medium that traps hydrocarbon compounds and the carbon-containing particulates included in the flow of exhaust gas in a dispersive manner to bring the respective particulates and hydrocarbon compounds in contact with oxygen included in the exhaust gas, and thereby makes the trapped hydrocarbon compounds and the trapped carbon-containing particulates subjected to combustion with the exhaust gas having a filter inflow temperature lower than a combustible temperature of the carbon-containing particulates;

a second heat-resistant filter medium that traps the remaining carbon-containing particulates, which have not been trapped by said first heat-resistant filter medium but have passed through said first heat-resistant filter medium; and a vane that is located on a pathway of the flow of exhaust gas from said internal combustion engine, is driven by the flow of exhaust gas, and breaks down the particulates included in the flow of exhaust gas, wherein said first heat-resistant filter medium is disposed upstream of said vane, and said second heat-resistant filter medium is disposed downstream of said vane.

6. An emission control device in accordance with claim 5, wherein said internal combustion engine is provided with a supercharger that utilizes fluidization energy of the exhaust gas to supercharge intake air of said internal combustion engine, and said vane is a turbine of said supercharger actuated by the flow of exhaust gas.

7. An emission control device in accordance with claim 1, said emission control device further comprising a control catalyst that is disposed in back wash of said second heat-resistant filter medium to reduce air pollutants flown with the exhaust gas out of said emission control device.

8. An emission control device in accordance with claim 1, wherein said second heat-resistant filter medium has an active oxygen release agent carried thereon, the active oxygen release agent taking in and holding oxygen in the presence of excess oxygen in its atmosphere and releasing the oxygen held therein as active oxygen with a decrease in concentration of oxygen in the atmosphere.

9. An emission control device that reduces carbon-containing particulates included in a flow of exhaust gas from an internal combustion engine, said emission control device comprising:

a first heat-resistant filter medium that traps hydrocarbon compounds and the carbon-containing particulates included in the flow of exhaust gas in a dispersive manner to bring the respective particulates and hydrocarbon compounds in contact with oxygen included in the exhaust gas, and thereby makes the trapped hydrocarbon compounds and the trapped carbon-containing particulates subjected to combustion with the exhaust gas having a filter inflow temperature lower than a combustible temperature of the carbon-containing particulates; and a second heat-resistant filter medium that traps the remaining carbon-containing particulates, which have not been trapped by said first heat-resistant filter medium but have passed through said first heat-resistant filter medium;

wherein said second heat-resistant filter medium has an active oxygen release agent carried thereon, the active oxygen release agent taking in and holding oxygen in the presence of excess oxygen in its atmosphere and releasing the oxygen held therein as active oxygen with a decrease in concentration of oxygen in the atmosphere, and wherein said second heat-resistant filter medium has a noble metal catalyst belonging to a platinum group carried thereon, in addition to the active oxygen release agent.

10. An emission control device that reduces carbon-containing particulates, which are included in a flow of exhaust gas with a variation in flow rate emitted from an internal combustion engine, using a filter material having a large number of pores tangled in a three-dimensional manner, said emission control device comprising:

a first heat-resistant filter medium that is composed of the filter material, makes the exhaust gas flown into the pores, which are greater in size than the carbon-containing particulates, and causes the carbon-containing particulates to collide with and adhere to regions defining the pores of the filter material, thereby trapping the carbon-containing particulates;

a second heat-resistant filter medium that filters the flow of exhaust gas passing through said first heat-resistant filter medium to trap the remaining carbon-containing particulates included in the flow of exhaust gas; and a flow rate variation mitigation module that mitigates the variation in flow rate of the exhaust gas flown into said second heat-resistant filter medium;

wherein said first heat-resistant filter medium traps hydrocarbon compounds and the carbon-containing particulates included in the flow of exhaust gas in a dispersive manner to bring the respective particulates and hydrocarbon compounds in contact with oxygen included in the exhaust gas, and thereby makes the trapped hydrocarbon compounds and the trapped carbon-containing particulates subjected to combustion with the exhaust gas having a filter inflow temperature lower than a combustible temperature of the carbon-containing particulates, and said second heat-resistant filter medium has an active oxygen release agent carried thereon, the active oxygen release agent taking in and holding oxygen in the presence of excess oxygen in its atmosphere and releasing the oxygen held therein as active oxygen with a decrease in concentration of oxygen in the atmosphere.

11. An emission control device in accordance with claim 10, wherein said flow rate variation mitigation module comprises a supercharger that is actuated by fluidization energy of the exhaust gas and supercharges intake air of said internal combustion engine.

12. An emission control device in accordance with claim 11, wherein said flow rate variation mitigation module further comprises a flow-restriction element that is disposed in back wash of said second heat-resistant filter medium to restrict the flow of the exhaust gas.

13. An emission control device in accordance with claim 12, wherein said flow-restriction element is a control catalyst that reduces air pollutants included in the flow of exhaust gas passing through said second heat-resistant filter medium.

14. An emission control method that reduces carbon-containing particulates included in a flow of exhaust gas from an internal combustion engine, said emission control method comprising the steps of:

uniting flows of exhaust gas from a plurality of combustion chambers of said internal combustion engine to at least one joint flow in an exhaust manifold;

using a first heat-resistant filter medium disposed in said exhaust manifold to trap hydrocarbon compounds and the carbon-containing particulates included in the united flow of exhaust gas in a dispersive manner to bring the respective particulates and hydrocarbon compounds in contact with oxygen included in the exhaust gas; making the trapped hydrocarbon compounds and the trapped carbon-containing particulates subjected to combustion with the exhaust gas having an inflow temperature into said first heat-resistant filter medium lower than a combustible temperature of the carbon-containing particulates; and using a second heat-resistant filter medium disposed in an exhaust pipe to trap the remaining carbon-containing particulates, which have not been trapped by said first heat-resistant filter medium but have passed through said first heat-resistant filter medium, in said exhaust pipe through which the exhaust gas that has passed through the first heat-resistant filter medium is released to the air.

15. An emission control method that reduces hydrocarbon compounds and carbon-containing particulates, which are included in a flow of exhaust gas with a variation in flow rate emitted from an internal combustion engine, using a filter material having a large number of pores tangled in a three-dimensional manner, said emission control method comprising the steps of:

making the exhaust gas flow into pores of a first heat-resistant filter medium that is composed of the filter material, the pores of the first heat-resistant filter medium greater in size than the carbon-containing particulates, and causing the carbon-containing particulates to collide with and adhere to regions defining the pores of the filter material, thereby trapping the hydrocarbon compounds and the carbon-containing particulates in a dispersive manner to bring the respective particulates and hydrocarbon compounds in contact with oxygen included in the exhaust gas, and thereby making the trapped hydrocarbon compounds and the trapped carbon-containing particulates subjected to combustion with the exhaust gas having a filter inflow temperature lower than a combustible temperature of the carbon-containing particulates;

mitigating the variation in flow rate of the exhaust gas; and filtering the flow of exhaust gas with the mitigated variation in flow rate through a second heat-resistant filter medium with an active oxygen release agent carried thereon, the active oxygen release agent taking in and holding oxygen in the presence of excess oxygen in its atmosphere and releasing the oxygen held therein as active oxygen with a decrease in concentration of oxygen in the atmosphere, thereby trapping the remaining carbon-containing particulates included in the flow of exhaust gas.

* * * * *